(12) United States Patent
Porter

(10) Patent No.: US 7,438,261 B2
(45) Date of Patent: Oct. 21, 2008

(54) STRATOSPHERIC BALLOON UTILIZING ELECTROSTATIC INFLATION OF WALLS

(75) Inventor: David R. Porter, 1821 Cross Creek Rd., Huntsville, AL (US) 35802

(73) Assignee: David R. Porter, Huntsville, AL (US)

( * ) Notice: Subject to any disclaimer, the term of this patent is extended or adjusted under 35 U.S.C. 154(b) by 391 days.

(21) Appl. No.: 10/937,866

(22) Filed: Sep. 9, 2004

(65) Prior Publication Data
US 2006/0049305 A1    Mar. 9, 2006

(51) Int. Cl.
   B64B 1/42    (2006.01)
   B64B 1/58    (2006.01)
   B64B 1/44    (2006.01)

(52) U.S. Cl. .................. 244/31; 244/30; 244/159.2; 244/126; 244/123.11

(58) Field of Classification Search ............. 244/30–33, 244/123.11, 125–128, 158.3, 159.2, 96–99, 244/205, 158.8, 100 A; 280/735; 455/431
See application file for complete search history.

(56) References Cited

U.S. PATENT DOCUMENTS

| | | | | |
|---|---|---|---|---|
| 2,612,328 A | * | 9/1952 | Huch | 244/31 |
| 2,996,212 A | * | 8/1961 | O'Sullivan, Jr. | 244/158.3 |
| 3,149,017 A | * | 9/1964 | Ehrreich et al. | 244/31 |
| 3,277,479 A | * | 10/1966 | Struble, Jr. | 342/8 |
| 3,277,724 A | * | 10/1966 | Lundeberg | 73/432.1 |
| 3,391,883 A | * | 7/1968 | Curtis | 244/31 |
| 3,420,469 A | * | 1/1969 | McCullough et al. | 244/158.3 |
| 3,519,530 A | * | 7/1970 | Struble, Jr. | 428/152 |
| 3,546,706 A | * | 12/1970 | Maurer et al. | 343/840 |
| 3,605,107 A | * | 9/1971 | Amboss et al. | 343/915 |
| 3,624,653 A | * | 11/1971 | Kelly et al. | 342/10 |
| 3,676,276 A | * | 7/1972 | Hirshet et al. | 428/12 |
| 4,021,267 A | * | 5/1977 | Dettling | 136/246 |
| 4,262,864 A | * | 4/1981 | Eshoo | 244/31 |
| 4,361,297 A | * | 11/1982 | Pommereau et al. | 244/97 |
| 4,366,936 A | * | 1/1983 | Ferguson | 244/2 |
| 4,865,266 A | * | 9/1989 | George | 244/31 |
| 4,877,205 A | | 10/1989 | Rand | |

(Continued)

OTHER PUBLICATIONS

Communications from High Altitude Plaforms—A European Perspective (University of York—U.K.).

(Continued)

Primary Examiner—Michael R. Mansen
Assistant Examiner—Joshua J Michener
(74) Attorney, Agent, or Firm—Kramer Levin Naftals & Frankel LLP; Gregor N. Neff

(57) ABSTRACT

The high-altitude balloon has a skin made of nearly evacuated electrostatically inflated cells which provide thermal insulation to minimize heat loss from the gas in the balloon, while transmitting heat from the sun to heat the gas. The lower surface of the balloon is reflective to microwave or laser beams. A stable array of the balloons is maintained at a high altitude and is used to facilitate communications in a worldwide communications system. Ascent of the balloon is well controlled and weight is minimized by starting with lighter-than-air gases in liquid form, releasing a lifting gas into the craft, and then using the empty containers to store the remaining gas when the balloon is aloft.

15 Claims, 15 Drawing Sheets

U.S. PATENT DOCUMENTS

| | | | |
|---|---|---|---|
| 4,986,494 A * | 1/1991 | Tockert | 244/96 |
| 5,076,513 A * | 12/1991 | Regipa et al. | 244/31 |
| 5,115,998 A * | 5/1992 | Olive | 244/31 |
| 5,579,609 A * | 12/1996 | Sallee | 52/2.11 |
| D378,673 S | 4/1997 | Aochi et al. | |
| 5,992,795 A * | 11/1999 | Tockert | 244/31 |
| 6,167,263 A | 12/2000 | Campbell | |
| 6,290,172 B1 * | 9/2001 | Yajima et al. | 244/31 |
| 6,354,535 B1 | 3/2002 | Perry et al. | |
| 6,357,700 B1 * | 3/2002 | Provitola | 244/171.1 |
| 6,386,480 B1 | 5/2002 | Perry et al. | |
| 6,546,934 B1 * | 4/2003 | Ingle et al. | 128/898 |
| 6,575,403 B1 * | 6/2003 | Monroe | 244/31 |
| 6,607,163 B2 | 8/2003 | Perry et al. | |
| 6,628,941 B2 | 9/2003 | Knoblach et al. | |
| 6,685,136 B2 | 2/2004 | Yajima et al. | |
| 7,055,777 B2 * | 6/2006 | Colting | 244/30 |
| 2001/0002686 A1 * | 6/2001 | Yokomaku et al. | 244/30 |
| 2003/0160733 A1 * | 8/2003 | Lee et al. | 343/912 |
| 2007/0029448 A1 * | 2/2007 | Powell | 244/171.3 |

OTHER PUBLICATIONS

Stratospheric Net Service Floats Into Action (Kristi Coale) Wired News Jan. 21, 2004.
America's Other Space Program JPAeroscape.Com Feb. 22, 2004.
HGlobal Constellation of Stratospheric Scientific Platforms—Phase II NASA Institute of Advanced Concepts 2002.
Broadband communications from a high-altitude platform: the European HeliNet programme (J. Thornton et al.) Electronic & Communication Engineering Journal Jun. 2001.
Special Fuel Cells Key To Months-Long Flight (Michael A. Dornheim) Aviation Week & Space Technology Feb. 28, 2000.

* cited by examiner

STRATOSPHERIC BALLOON UTILIZING ELECTROSTATIC INFLATION OF WALLS

This invention relates to stratospheric and space structures and methods and particularly to inflatable objects such as high-altitude balloons and components thereof; electrostatically inflatable structures and methods and communications systems and methods utilizing same.

Current global communications systems use land lines, radio towers, and satellites for communications within populated areas and between remote locations. Each one of these methods has drawbacks.

New land lines become extremely expensive to install in densely populated areas due to the high congestion and the high cost of "right-of-ways." Land lines may not justify the investment in sparsely populated remote locations where distances are greater and revenues are less.

The range of radio towers are fundamentally limited by the curvature of the Earth, natural terrain features, atmospheric conditions, and man-made structures. The high cost of tower construction may also be prohibitive in sparsely populated remote locations.

The launch cost for satellites is exceptionally high. Satellites provide line-of-sight coverage over wide areas, but also have fundamental technical limitations. Geosynchronous satellites are very high above the surface of the Earth (i.e., approximately 22,241 statute miles). Propagation delays are significant and high-gain antennas are required to obtain reasonable signal-to-noise ratios.

Low Earth Orbit (LEO) satellites circle much closer to the Earth's surface (200-500 statute miles). However, because their orbit is so close to earth they must travel much faster relative to the Earth's surface to stay in orbit. Satellites in LEO speed along at approximately 17,000 miles per hour and circle the Earth in about 90 minutes. A large number of LEO satellites are required to provide continuous coverage over a specific location on the surface.

It is believed that there are numerous projects currently under way by NASA and private industry to develop long-duration, high-altitude balloons and aircraft for use in ground-to-ground communications or scientific missions. Many of these projects are based on designs that are intended to carry heavy payloads to high altitudes.

These altitudes are well above the ceiling of commercial aircraft flight. The Lockheed SR-71 is believed to hold the high-altitude record for non-rocket, jet-powered aircraft, at 85,068 ft. It is believed that NASA's solar powered Helios experimental aircraft reached an altitude of 96,500 ft., in 2001, and that the TIGER balloon, for cosmic radiation research, reached an altitude of 133,000 ft., in 1997. NASA's Ultra Long Duration Balloon (ULDB) is intended to reach an altitude of 115,000 ft. and stay aloft for 100 days with a 3,500-lb. payload. So far, the ULDB is believed to have reached an altitude of 95,000 ft. The ULDB is very large and expensive. It has a height of 500 ft., 20 acres of composite skin, and 20 miles of seams.

One of the most significant problems for high-altitude aircraft and balloons is maintaining altitude during night time. Helios uses solar cells to store energy during the daytime. Stored energy is used to sustain an array of propellers at night. It is understood that the ULDB maintains its altitude at night by allowing the balloon to be over-pressured during the day. This approach requires a very strong and non-elastic skin (i.e., the balloon has a constant volume).

A new balloon concept is needed that maximizes the altitude, maintains the balloon's altitude at night, stays aloft longer, and cost less to make. A global communications system concept is needed that provides continuous coverage over the entire planet with a reasonably affordable number of High-altitude reflectors. If this capability can be realized on a global scale, then many people can have ready access to high-bandwidth communications. The effect on society would be profoundly positive: benefiting the economies; protecting the environment; and improving the human condition.

In accordance with the present invention, the foregoing objectives are satisfied by the provision of a ultra-light, moderate cost, high altitude balloon with a skin, preferably comprised of electrostatically inflated insulators which help govern and control the unwanted loss of heat from the balloon interior, and a communication system and method utilizing an array of such balloons as reflectors.

Also provided by the invention is a new building block for use in stratospheric and space structures such as balloons and space vehicles, satellites, etc., and in other very low-pressure ambient conditions. This building block is a closed container with flexible walls with opposed conductive internal surfaces within which a positive or negative electric charge is established which causes the walls to repel one another with a force which exceeds the ambient pressure on the outside of the container and inflates it.

Preferably, the container is substantially devoid of air so as to form a good heat insulator.

A wall capable of containing a gas in a balloon is formed by joining a plurality of the electrostatically-inflatable containers side-by-side. It is preferred that the polarity of the field in each container is opposite to the polarity of the fields in adjacent containers so that the field polarity alternates in successive containers.

One particular such wall preferably is transparent to sunlight and near-infrared radiation so as to transmit radiant energy to heat a gas in the balloon or other structure and insulate the gas or structure from heat loss through conduction.

This wall is used to advantage to form at least the upper part of a lighter-than-air gas enclosure for a high-altitude balloon, so as to facilitate a daytime heating of the gas and nighttime insulation against heat loss.

Preferably, a balloon is provided with a reflective lower surface for use in a communications system.

Also, it is preferred that the balloon's differential pressure is maintained at a constant level by pumping in or venting outside air so that the reflective lower surface is free from distortion which might be caused by expansion or contraction of the gas.

A preferred global communications system is described that is based on a constellation of high-altitude reflectors, called the earth stratospheric array (ESA). These communications platforms are lighter-than-air craft that have convex-shaped, microwave- and/or optically-reflective lower surfaces. Ground-to-ground communications is made possible by reflecting signals off of the High-altitude reflectors.

The reflected signal is dispersed over a wide area of the Earth's surface when a nearly collimated beam, originating from the ground, is focused on the reflector. When the beam reaches the reflector it should have a diameter that is approximately the same diameter as the reflector. Collimated beams are generated by steering, ground-based, high-gain antennas or optical signal sources.

Pointing information for the ground transmitter/receiver is derived from the Global Positioning System (GPS). Additionally, microwave antennas or optical sensors, located on the perimeter of the high-altitude reflector, may be used to measure signal strength and to correct for steering vector errors due to atmospheric refraction of the microwave or optical signal.

The global communications system is predominantly a broadcast system; however, bi-directional communications is possible; although, at a much lower data rate in the outbound direction, from the individual user's perspective. The content of broadcast information may be controlled locally. Signals are broadcast during temporal "windows-of-opportunity" when a high-altitude reflector is within range. Coverage becomes more complete as more reflectors are added to the ESA.

A high-altitude reflector craft predominantly moves with the wind; however, a limited amount of controlled movement is possible. A lightweight annular truss forms the primary structure of the high-altitude reflector. Two propellers, located on opposite sides of the annular truss, are used for propulsion. Propulsion may be used to maintain a fixed position, move in a direction that maximizes the separation between adjacent high-altitude reflectors, or to travel to a desired landing site.

The balloon is constructed with an "electrostatic balloon skin" consisting of rows of oppositely charged cavities, made with reinforced polymeric sheets that have electrically conducting inner surfaces. When the cavity is sufficiently charged, and when the balloon reaches a sufficient altitude, the skin is inflated. It has a near vacuum inside, thus forming a thermally insulating layer and also reducing the density of the skin. The altitude of the balloon is maximized by solar heating. The interior gas is heated during the daytime. The insulating skin helps to retain the heat during the nighttime.

Preferably, power is transmitted to the balloon by microwave beams from the ground. Antennas are provided in the lower portion of the balloon to receive the power.

A rechargeable battery is used to store a portion of the microwave energy that is received from the ground. A hydrogen fuel cell provides an alternative source for charging the battery. Power is required for propulsion, charging the electrostatic balloon skin, and for operating other communications and control subsystems.

The high-altitude reflector has two balloon chambers. The upper chamber contains helium gas. The lower chamber is filled with native air. Outside air is pumped into or vented from the lower chamber to maintain a constant pressure, while maintaining a constant overall balloon shape. This minimizes stress in the balloon skin, thereby increasing the lifetime of the craft. By operating at a relatively lower internal pressure, the internal gas density is reduced and the overall balloon weight is reduced. This increases the maximum altitude that can be attained and maximizes the communication coverage area.

Insulated pressure vessels are evenly distributed around the annular truss. Prior to liftoff, most of the pressure vessels are filled with liquid helium. A few of the pressure vessels are filled with liquid hydrogen. At liftoff, the lower chamber is fully filled with heated native air and the upper chamber is completely empty. Initially, the craft is functioning entirely as a hot-air balloon.

The pressure differential (inside-to-outside pressure), altitude, and ascent rate are monitored by pressure sensors. As the craft starts to ascend, warm helium is released into the upper chamber to maintain lift. The helium is boiled and heated by burning a portion of the hydrogen. As the air in the lower chamber expands, a portion of the air is vented to the outside to maintain a constant differential pressure. All of the helium has been boiled off and the helium tanks are nearly empty when the craft reaches its desired altitude (e.g., 100,000 ft.).

Only one-third of the liquid hydrogen is burned off to heat the helium gas. When the craft first reaches the desired altitude the remaining hydrogen is still in liquid form. However, the hydrogen will continue to slowly boil off and become gaseous. Valves are closed to prevent any further release of gas into the balloon's upper chamber. Other valves are opened to allow the hydrogen gas to fill the nearly empty vessels, previously filled with liquid helium. The gas pressure will increase as more hydrogen is converted to gas. The hydrogen gas pressure is at the maximum rated pressure of the gas storage vessels when all of the hydrogen is converted to a gas.

After the foregoing procedure, the craft has been lofted to the desired altitude while maintaining a substantially constant pressure differential and balloon shape. The fuel storage tanks are at maximum pressure, full of hydrogen gas. Hydrogen gas is the primary source of energy for powering the High-altitude reflector.

The electrostatic balloon skin is charged when the craft reaches a high altitude (about 70,000 ft.). A relatively low external pressure is required in order to inflate the electrostatic balloon skin. At low altitudes the pressure is too great to inflate the skin. The Electrostatic Balloon Skin provides an insulating layer that helps to maintain a relatively warm internal temperature.

It is believed that the electrostatic balloon of the invention is capable of reaching and maintaining a significantly higher altitude than is possible for a conventional balloon, where the internal and external temperatures are the same.

Controlled descent can be accomplished by discharging the electrostatic balloon skin and allowing the internal temperature to equalize with the external temperature. Cold native air is pumped into the lower chamber to maintain a constant differential pressure. To slow the decent prior to landing, hydrogen is burned to heat the interior air. Once on the ground, the helium in the upper chamber is pumped out and recovered for recycling.

System equipment (i.e., power generation, communications, and guidance and control) are co-located on a "systems platform." The systems platform is physically located on the centerline and near the bottom within the balloon's lower chamber. The systems platform is suspended by support rods from the annular truss. This configuration helps to lower the overall center-of-gravity of the craft. A low center-of-gravity makes the craft inherently more stable.

Prior to filling the balloon, the craft can be assembled in a hanger that has a relatively low ceiling, a significant logistic advantage. The craft can be handled by the external annular truss during the launch and recovery processes, a significant practical advantage.

The foregoing and other objects and advantages of the invention will be set forth in or apparent from the following description and drawings.

IN THE DRAWINGS

COMMUNICATIONS SYSTEM AND METHOD

Figure 1:
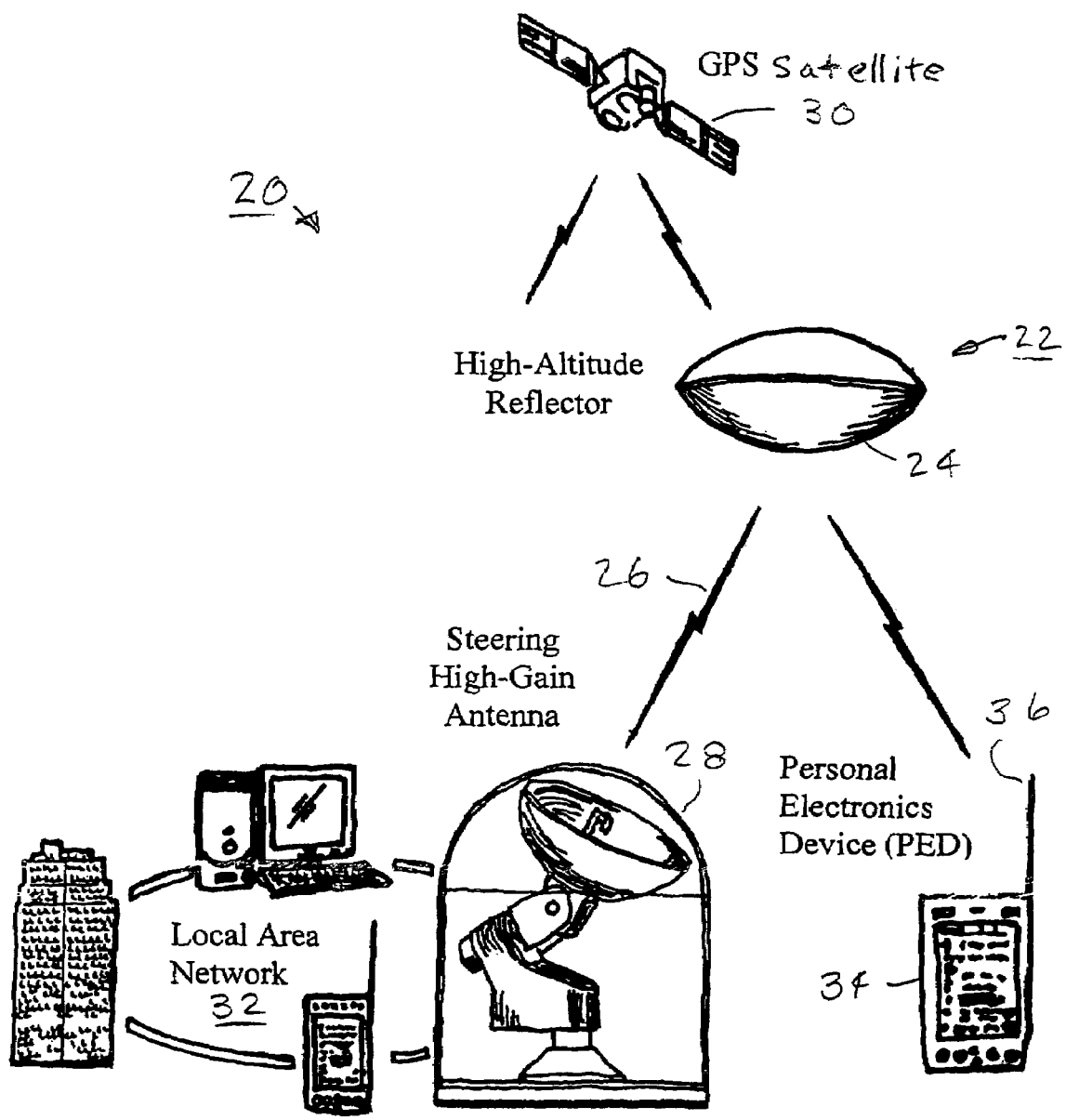
FIG. 1 is a schematic diagram of a communications system constructed in accordance with the present invention.

The major components of the global communications system 20 are illustrated in FIG. 1. The central component is a saucer-shaped high-altitude reflector 22. This component is an oblate spheroid-shaped lighter-than-air craft or "balloon" intended to navigate in the stratosphere for relatively long periods of time and to facilitate ground-to-ground communications. Its convex lower half 24 serves as a dispersive reflector for microwave and/or optical signals. A collimated microwave beam 26 transmitted from a steering high-gain antenna 28 reflects off of the lower surface 24 of the high-altitude reflector. The reflected beam pattern is broad and covers a substantial area on the earth's surface.

A GPS satellite 30 is representative of the existing network of GPS satellites that transmit position location data. Signals from four or more GPS satellites provide the necessary information for a GPS receiver to calculate its precise location (i.e., latitude, longitude, and altitude) of the balloon 22. Similarly, GPS may be used to determine the location on the ground of the steering high-gain antenna 28. The GPS location of the high-altitude reflector is transmitted to the ground. The two locations are used to calculate the steering vector that focuses the collimated microwave beam on the reflector 22. As the high-altitude reflector moves in 3-dimensional space, the steering vector is continuously recalculated and the antenna is steered to follow its movement, or to lock onto another reflector.

Atmospheric conditions can cause refraction (bending) of the microwave beam. This bending can cause the beam to partially or entirely miss the reflector 22. Refraction is largest when the beam is at low angles over the horizon. This effect is beneficial for some communications systems. Refraction bends a propagating electromagnetic wave over the horizon and has the effect of extending the range beyond the expected line-of-sight range. For the proposed system, refraction is not necessarily advantageous. This potential problem can be mitigated by measuring the signal power on opposite sides of the reflector and adjusting the steering vector to balance the signal power levels between the two antennas.

Wideband signals are transmitted from the steering high-gain antenna 28 to individual users via the high-altitude reflector 22. Information may originate from a wide variety of institutional sources or from other individual users. Types of information include: entertainment, education, news, software, financial data, publications, and business communications. Information from various sources is collected via a local area network (LAN) 32, electronically combined, and is broadcast to individual users. Individual users are capable of receiving any of the broadcast information; however, in practice users usually will only decode and store wanted and authorized information.

An individual user receives the microwave signal with an omni-directional antenna 36 attached to a personal electronics device (PED) 34, as an example. The microwave signal transmitted by the antenna 28 is received by any user PED that is within the receiving area. Similarly, multiple steering high-gain antennas may use a common high-altitude reflector to broadcast their microwave signals. However, to prevent interference, some form of multiplexing usually is necessary (i.e., time-division, code-division, space-division, or frequency division multiplexing).

Individual PEDs may directly transmit back to a steering high-gain antenna operating in the receive mode; however, the system gain is much lower than with the antenna 28 because the transmit power of the PED is much lower and its signal is transmitted in all directions. This suggests that the steering high-gain receivers should have either much higher gain or be much more sensitive than the broadcasting high-gain antenna 28. One simple way to make a receiver more sensitive is to limit the bandwidth. Receiver sensitivity is inversely proportional to the receiver bandwidth.

The same basic communications concept may be employed with an optical system. In an optical system, a moderately powered laser may be used to illuminate the high-altitude reflector with a collimated optical beam. A photodiode or avalanche photodiode (APD) is used to receive the optical signal. In the reverse direction the individual user may use a low-power defocused laser to transmit a signal to a high-gain optical receiver. A mixed mode system, i.e., one using both laser and microwave beams, also is possible. Microwave and optical systems may be transmitted simultaneously and without interference via a common high-altitude reflector 22.

If an individual user desires to transmit wideband information, he should do so by accessing a LAN connected to a local steering high-gain antenna or by transmitting via some other higher bandwidth method such as satellite, or fiber-optic land lines. This bandwidth limitation in the outgoing direction usually will not be a serious disadvantage due to the fact that individuals are usually much bigger "information sinks" than they are "information sources." TV, movies, newspapers, books, technical reports, and computer software are examples of information that might be commonly broadcasted over a wideband channel. These forms of media provide information that is generally useful to a large number of individuals. In contrast, electronic mail from individuals typically contains much less information and may be transmitted at a much lower data rate.

The bandwidth of the broadcasted transmissions may also be limited by the signal dispersion caused by the texture of the balloon skin and multi-path effects. Signal drop-outs may also be common occurrences. This limitation may be partially overcome by providing a capability within a PED to repair media content by direct sharing via an infrared link (similar to a set-top Remote Control), a short-range wireless transceiver, or LAN access. This will require that PED hardware and operating systems be planned and designed from the start with the "data-repair" feature. For example, if a homework assignment has not been fully received, it may be completed by communicating with other nearby PEDs. Alternatively, information may be broadcast multiple times and the data-repair feature reconstructs the complete file from segments of separate transmissions.

For a steering high-gain broadcast antenna to be linked with a user, a high-altitude reflector must be in a suitable location in the stratosphere to support the connection. The coverage area is generally increased as the altitude of the reflector is increased. Also, the total number of reflectors that are required to cover the entire planet is reduced as the altitude is increased. It is also advantageous to have several high-altitude reflectors within range at the same time so that communications is almost continuous.

However, continuous communications is not essential for the system to be useful, especially in the initial phase of deployment. Newspapers and mail are typically delivered only once a day. TV, movies, and books could be downloaded in response to an order, recorded, and then read at a later time that is convenient for the user.

Alternatively, it is not always necessary to view new material as soon as it is received. With the increased capacity and low cost of electronic memory, it is possible to store information for days or weeks before it becomes available for use. The item is received and then lies dormant until the predetermined time arrives for its emergence. Examples of this type of information include: episodes in a series, lessons in a course, devotionals in a study, and books in a series. Any information that is not highly time sensitive could appear to be delivered on a regular interval even though the arrival is spotty and random. The key is to send it early.

Figure 2:
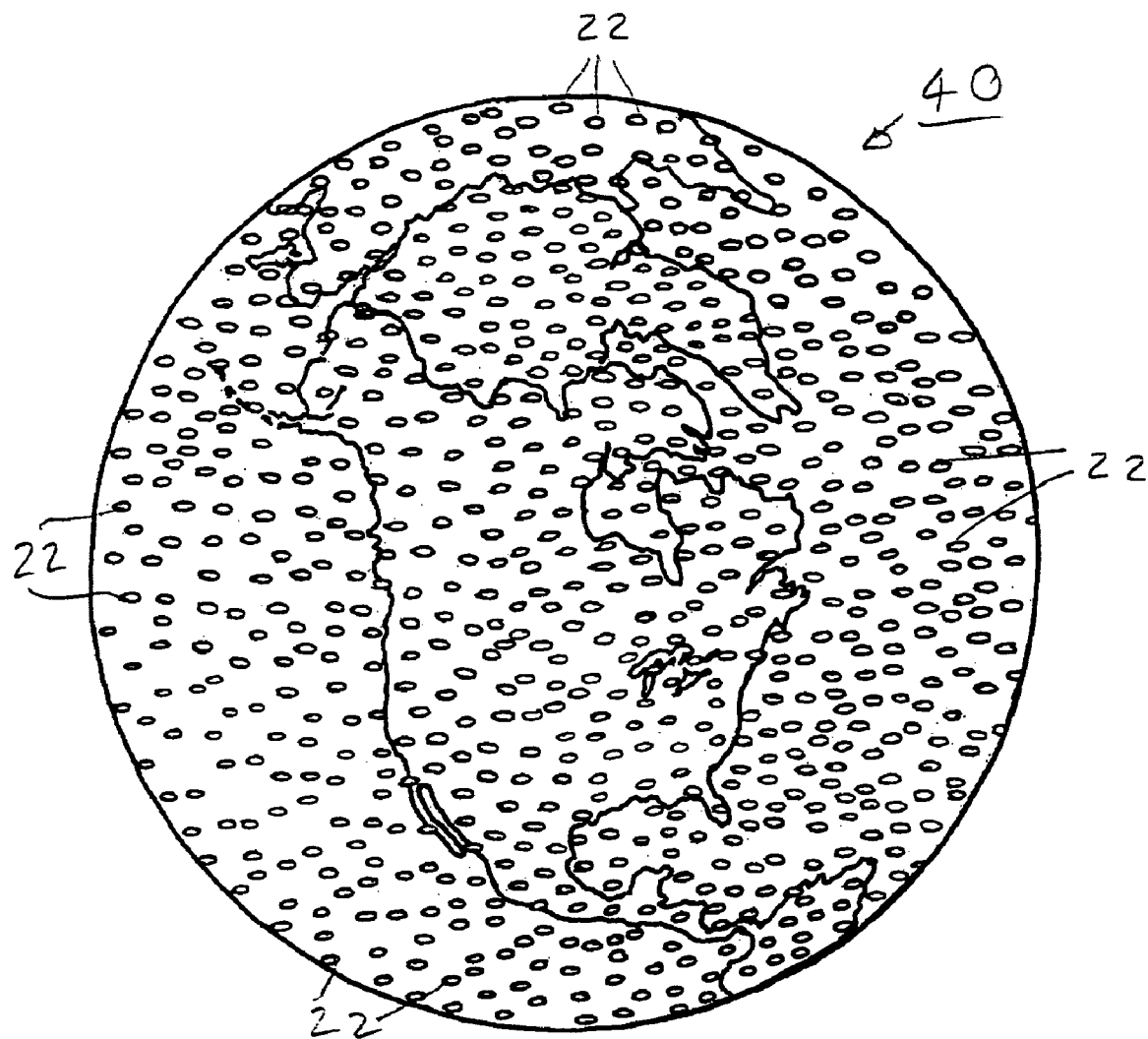
FIG. 2 is a schematic representation showing the dispersion and location around the world of high altitude reflectors used in the system shown in FIG. 1.

FIG. 2 shows an "earth stratospheric array (ESA)" 40 which is an organized constellation of high-altitude reflectors 22. It is envisioned that new reflectors can be deployed at appropriate times and locations to fill any gaps in the ESA.

High-altitude reflectors in the form of balloons generally follow the high-altitude wind patterns; however, they are capable of slowly navigating according to a centrally-controlled plan. The flight path of high-altitude reflectors is continuously adjusted to provide the most uniform coverage of the world by the ESA. Maintaining a substantially uniform coverage while conserving energy can be enabled with the aid of a computer simulation (at a central control center on the ground) to optimize the ESA. Furthermore, the status and condition of each high-altitude reflector is continuously monitored. When a high-altitude reflector is nearing the end of its flight time, it is commanded to land near a depot facility for maintenance, repair, and redeployment into service.

The number of high-altitude reflectors needed to provide 100% coverage of the Earth can be determined as follows: The earth's surface has an area of $1.71 \times 10^8$ km². At an altitude of 100,000 feet and a maximum coverage angle on the ground of 15 degrees per reflector, the coverage radius is 114 km or 71 miles. If there is an average of 3 reflectors within this area, then the entire planet can be covered with approximately 12,583 reflectors. If an altitude of 160,000 feet could be achieved, then less than 5,000 reflectors would be needed.

Revenues can be collected by planning from the outset to implement a system that uses a combination of data encoding, transmission and PED hardware, and a PED operating system that allows downloaded items to be linked with advertisements for a specified length of time. For example, a product or service provider agrees to pay the owner of the copyrighted material for the global or regional distribution rights. The advertisement is linked to the copyrighted material in a way that prevents the two from being separated for a specified period of time. When the period of time is complete (i.e., the owner of the copyrighted material has been paid in full) then the embedded advertisement(s) will automatically become inert.

High-Altitude Balloon

Figure 3:
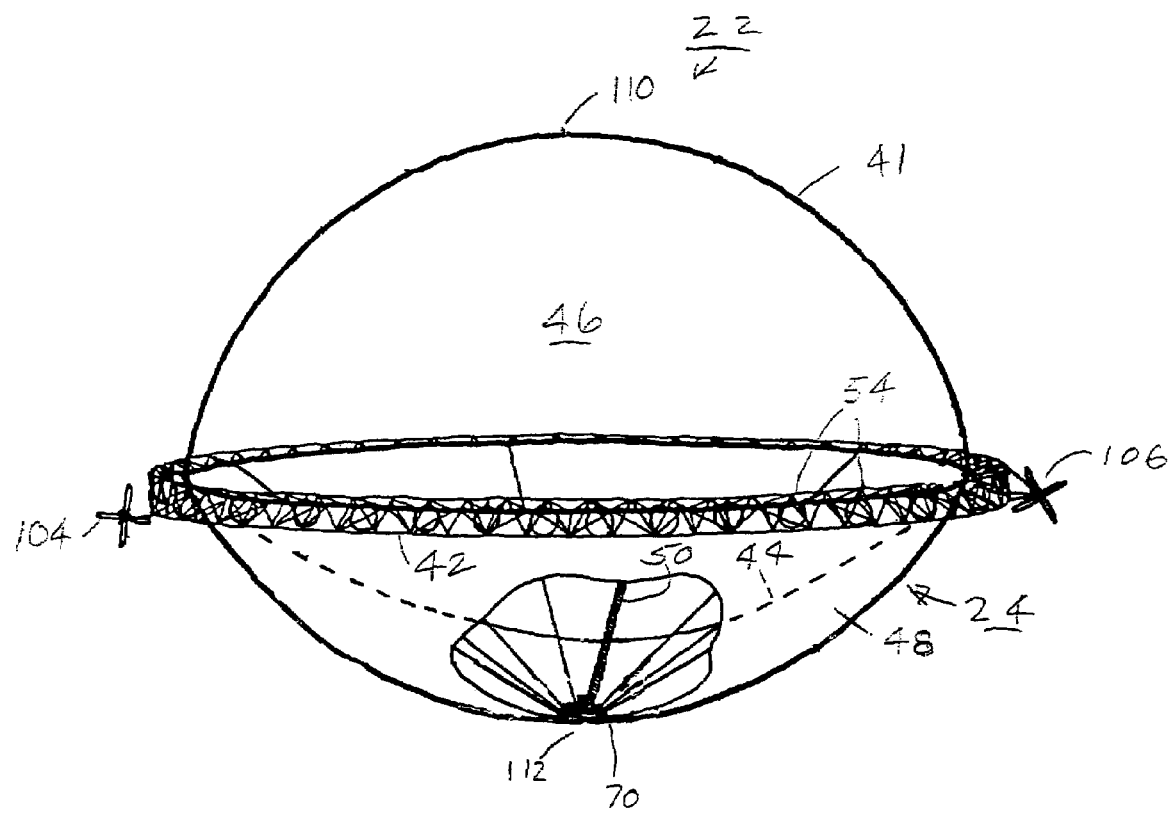
FIG. 3 is a partially schematic, partially broken away side elevation view of a high altitude balloon which can be used in the communication system illustrated in FIGS. 1 and 2.

The high-altitude reflector balloon 22 shown in FIG. 1 is shown in greater detail in FIG. 3. The balloon's preferred diameter is around 50 meters and its skin is comprised of "electrostatic balloon skin" which is described in detail below. Its upper hemisphere 41 is semi-transparent to facilitate heating from the sun. Its lower hemisphere 24 is reflective to both microwave and optical beams.

A stiff annular truss 42 supports the balloon's perimeter. An internal flexible diaphragm 44 separates an upper cavity 46 from a lower cavity 48. The upper cavity 46 is filled with helium (He) gas, while the lower half is filled with native gas (air). Alternatively, hydrogen ($H_2$) gas could be used instead of helium gas; however, it is a far more dangerous gas. The lower cavity 24 is filled with ambient air. Air is vented from the lower cavity or pumped into the lower cavity via an air duct 50. The balloon skin is broken away to show the air duct and nearby structure.

The annular truss serves several purposes. It helps to maintain a circular cross-sectional shape for the balloon, even under moderate wind loading conditions. This helps to maintain a symmetrical and spherically shaped reflector. It also provides a structure for mounting thrusters, antennas, cabling, sensors, gas and fuel storage, and a docking port. It also provides an external structure that is very useful during the construction phase, deployment phase, docking maneuvers, and the recovery phase (e.g., towing).

Figure 4:
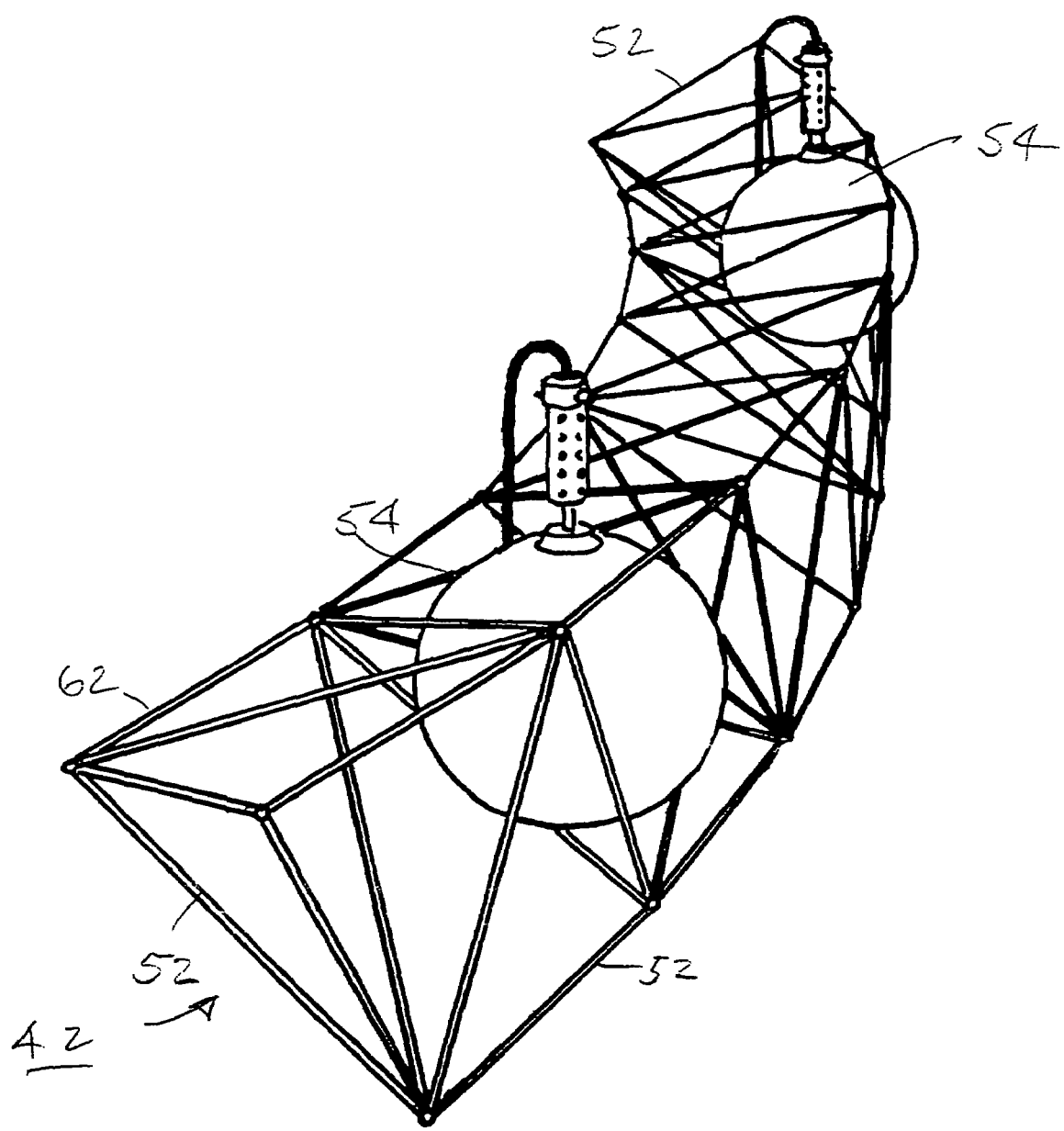
FIG. 4 is a perspective view of a portion of the structure of the balloon shown in FIG. 3.
Figure 5:
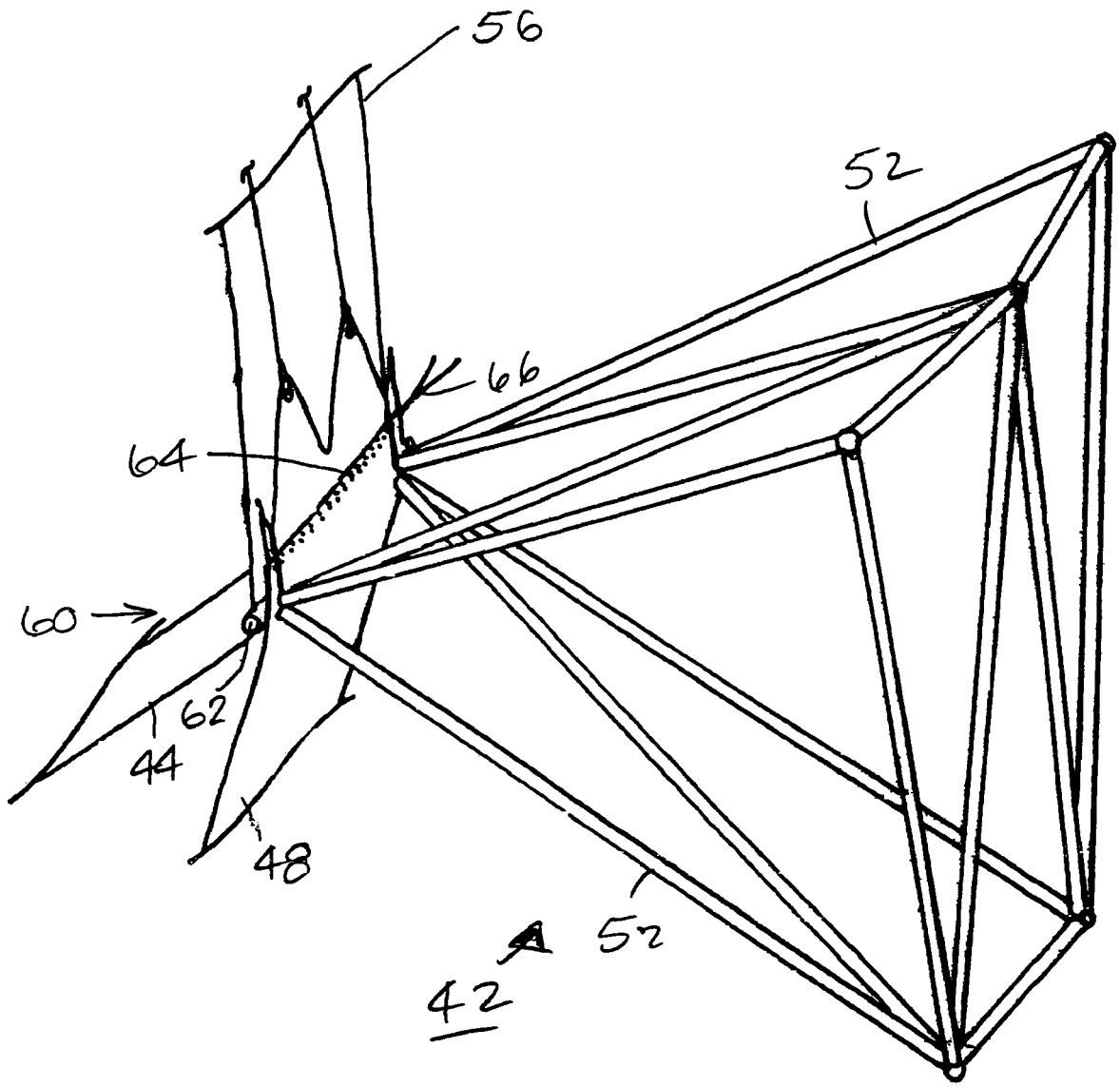
FIG. 5 is a perspective schematic view of another portion of the balloon structure of FIG. 3.

The annular truss 42 (details of which are shown in FIGS. 4 and 5) is made of very thin aluminum tubing or filament wound composite material 52 (similar to the material used in fishing rods). The annular truss is extremely lightweight and strong. Distributing the load on the truss evenly is done to prevent flexing the truss beyond its design limits.

Referring to FIG. 4 as well as FIG. 3, thermally insulated pressure vessels 54 are evenly distributed around the annular truss. Prior to liftoff, most of the pressure vessels are filled with liquid helium. A few are filled with liquid hydrogen, used for fuel.

Referring to FIG. 5, the balloon walls consist of three parts: (1) the skin 56 of the upper hemisphere; (2) diaphragm 44; and (3) skin 48 on the lower hemisphere. Each one of these walls is bonded together with the others at the joint 60 to form an air-tight seam. The upper and lower walls are reinforced with strength members consisting of small braided ropes made of a high-strength, light-weight synthetic fiber like Vectran™ or Spectra™.

The upper skin 56 is attached to the truss 42 by folding it around the innermost horizontal truss member 62 and attaching its strength members to form a loop around the member 62. Conductors within the upper and lower skin layers are terminated with conductive grommets 64. An electrical wiring harness 66 is connected to these grommets for charging the electrostatic balloon and for power collection.

Figure 6:
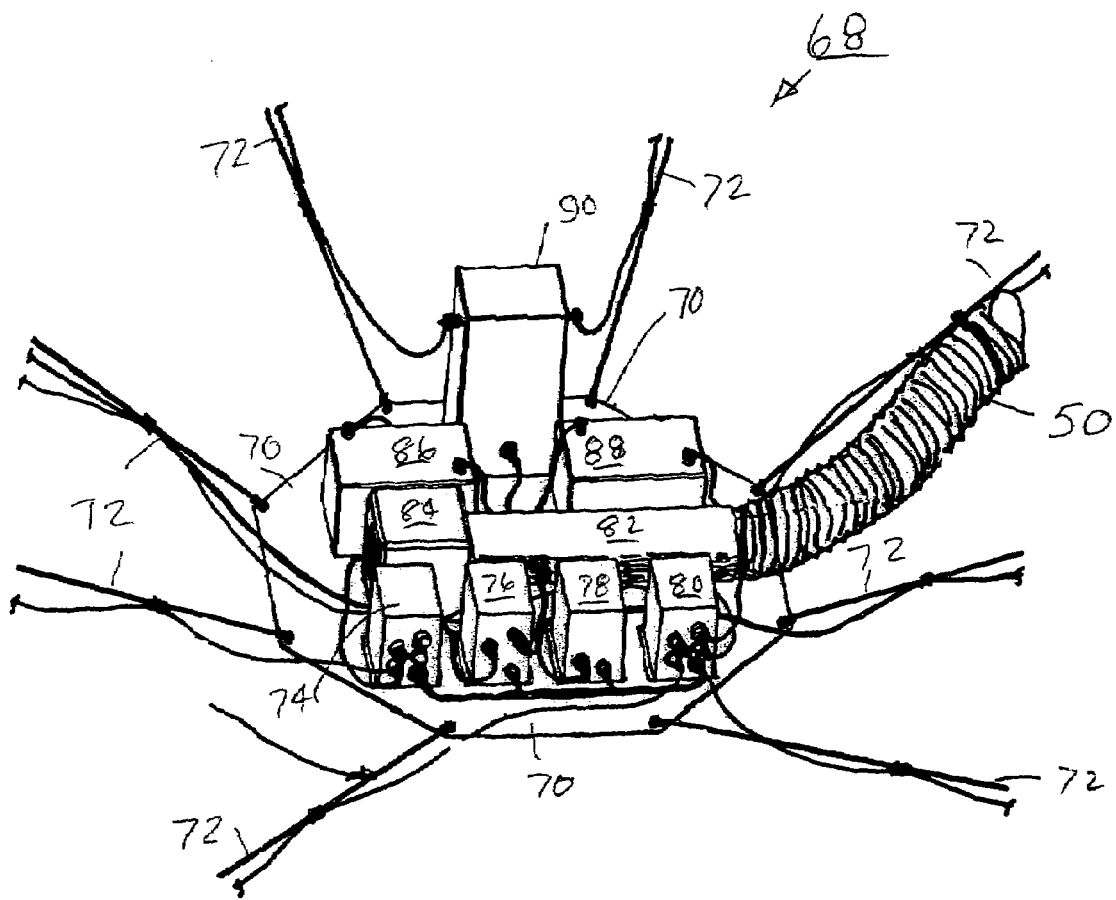
FIG. 6 is a perspective view, partially schematic, of electronic control and other equipment used in the balloon of FIG. 3.

FIG. 6 shows the electrical power and control system 68 for the balloon 22. The components are mounted on a systems platform 70 which is supported on the vertical centerline of the balloon by stiff rods or tubes 72 attached to the truss 42. The rods 72 are evenly distributed around the perimeter of the annular truss 42 to distribute the load. Preferably, the lower skin 48 is attached to the rods 72 to help hold the hemispherical shape of the lower hemisphere 48.

The system 68 includes: a system processor 74; a thruster control unit 76 for servo drivers 122 (FIG. 7) for the propulsion units; a microwave power converter 78; a communications interface unit 80; an air pump and gas heater 82; pressure sensors 84; a rechargeable battery 86; a hydrogen fuel cell 88; and a high-voltage charge pump 90.

Method of Manufacture

Assembly of the craft can be done in a large airplane hanger or other such building. For example, the Boeing 747 airliner has a wing span of 64.4 meters and length of 70.7 meters. Its tail height is 19.4 meters. A hanger used for servicing a Boeing 747 may be adequate for assembling of the high-altitude reflector. Large aircraft hangers are already in place all over the Globe.

Preferably, in an example of the method of manufacture, the annular truss 42 is assembled first. It is supported by floor stands evenly distributed in a circle. The stands raise the truss to eye level. The pre-assembled balloon is attached to the truss. A long tent-like structure is used to provide an access path to the center. The pre-assemble systems platform is installed inside the lower chamber through a slit in the center of the reflective (lower) surface of the balloon. The slit is sealed later after the balloon is inflated.

As it was explained above, the systems platform and the annular truss are interconnected by flexible support rods 72. During assembly, the support rods lay in a common plane. They are curved in a spiral shape so that the systems platform is at the same height as the annular truss. When the balloon is inflated the systems platform is allowed to rotate. The rods straighten and the systems platform moves into a suspended configuration, below the annular truss 42. This construction method allows the high-altitude reflector balloon 22 to be easily assembled and tested in a controlled environment, without the need for specialized equipment or large scaffolding.

Propulsion System

Referring again to FIG. 3, two propulsion units in the form of fans 104 and 106 are mounted to the annular truss 42 on opposite sides of the balloon. These fans are used to rotate the balloon to the desired heading, and also are used to propel it forward in a desired direction. A compass is used to measure the orientation of the High-altitude reflector relative to the Earth's magnetic field. The fans have variable speed motors and servo drivers 122 (FIG. 7) which are used to control rotation and forward motion under control of the systems processor 68 (FIG. 6).

Preferably, the fans 104 and 106 are oriented to direct their thrust parallel to each other and in the plane of the annular truss 42, and steering the balloon is achieved by varying the directions and speeds of the fans relative to one another. Alternatively, as a backup system, hydrogen-burning jets can be used instead of fans, if needed.

The balloon 22 is made inherently stable by placing the systems platform low and at the center of the craft. Although wind gusts and use of the thrusters may rock or tilt the craft, because the reflector is spherical in shape, the affect on communications is believed to be relatively small and inconsequential.

The components on the systems platform 70 are partially protected by being inside the balloon 20. The systems platform is at least partially protected from sun loading, moisture, atmospheric electrical activity, and atmospheric contaminants.

Electrostatic Balloon Skin

The primary function of the electrostatic balloon skin which forms the outside wall of the balloon is to thermally insulate the interior gas from the ambient atmosphere. The electrostatic balloon skin is made of "ribs" which are good thermal insulators because they are enclosures which contain a near vacuum.

When the sun is shining, the interior of the high-altitude reflector 22 is heated as if it were a large greenhouse, storing and retaining radiated energy from the sun. The thermally insulating electrostatic skin helps the balloon to retain much of that energy which otherwise would be lost at night.

The purpose of the interior diaphragm 44 is to conserve the helium or hydrogen gas in the upper cavity 46 while maintaining an overall constant balloon pressure and shape. Native air is vented as the interior gas is heated and pressurized during daytime, and is and pumped in to maintain pressure when the interior gas cools at night.

Figure 7:
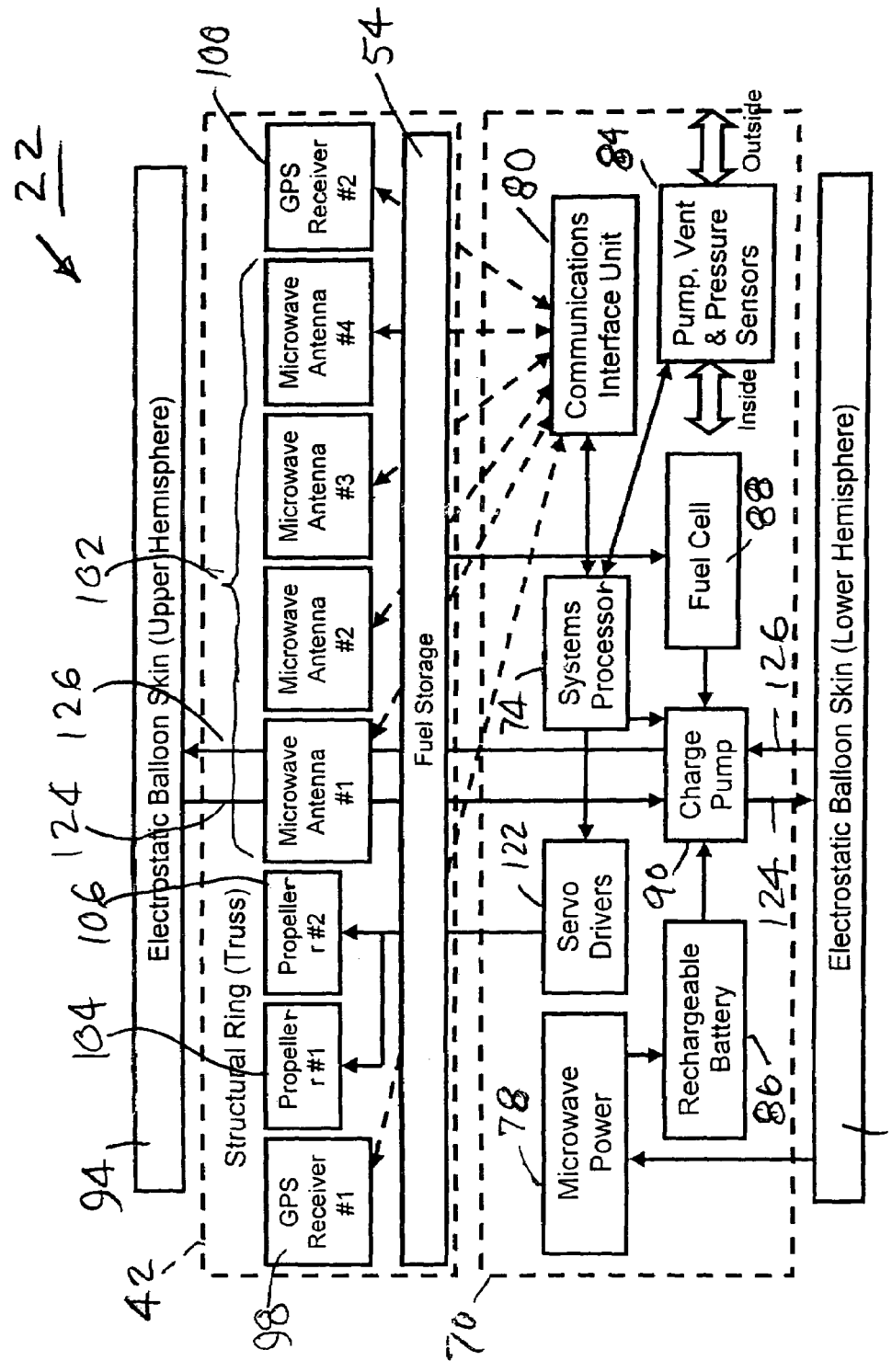
FIG. 7 is a schematic block diagram of the mechanical and electrical system of the balloon of FIG. 3.

FIG. 7 is a mechanical and electrical schematic of the high-altitude reflector or balloon 22. There are three major components: (1) structural ring or truss 42; (2) systems platform 20; and (3) electrostatic balloon skin for the upper hemisphere 94 and lower hemisphere 96. GPS receivers 98 and 100, microwave antennas 102, propulsion units 104 and 106, and pressure vessels 54 (FIG. 4) for hydrogen fuel storage are mounted to the structural ring or truss 42. The GPS receivers 98 and 100 are mounted on opposite sides of the truss from each other. The two fans 104 and 106 also are mounted on opposite sides of the truss from each other. They are driven by servo-drivers 122 under the control of the systems processor 74. The four microwave receivers #1 through #4 are mounted to the structural ring, equally spaced, one in each quadrant of the circle defined by the ring. The pressure vessels 54 also are uniformly spaced around the structural ring to distribute the load.

As noted above, the electrostatic balloon skin is comprised of two parts: (1) upper hemisphere skin 94; and (2) lower hemisphere skin 96. Both hemispheres are formed of electrostatic balloon ribs 108 (FIG. 8) that extend from the structural ring toward the poles 110 and 112 of the spherical balloon (FIG. 3).

Figure 8:
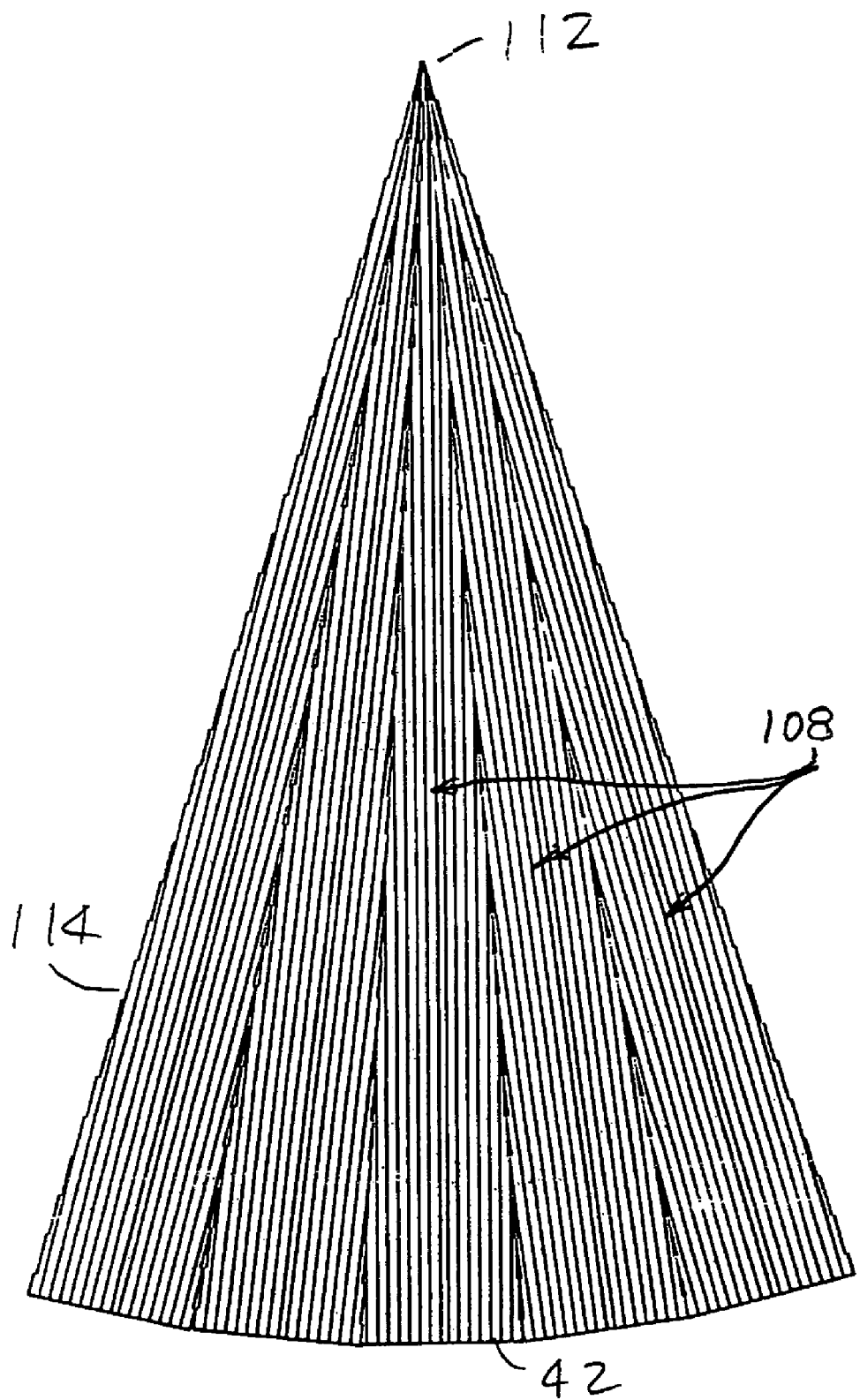
FIG. 8 is a partially schematic top plan view of a segment of the skin of the balloon shown in FIG. 3.

FIG. 8 is a section of the lower hemisphere skin showing the pole 112 of the lower hemisphere and the structural ring (truss) 42.

All electrostatic balloon ribs have a constant width (except at the ends). All of the ribs are electrically connected to one of two high-voltage buses 124, 126 at the structural ring. One high-voltage bus has a positive charge, while the other has an equal but opposite charge. These charges serve to inflate the hollow ribs, as it will be explained below.

Each rib is a sealed container having opposed conductive surfaces. The wall structure is made by forming conductive coatings where needed on thin thermo-plastic sheets, laying one of the sheets on the other with the conductive areas properly oriented, rolling the sheets or otherwise forcing the air out from between the sheets, and heat-sealing the sheets together to form joints between, the ribs and end closures for the ribs.

Figure 9:
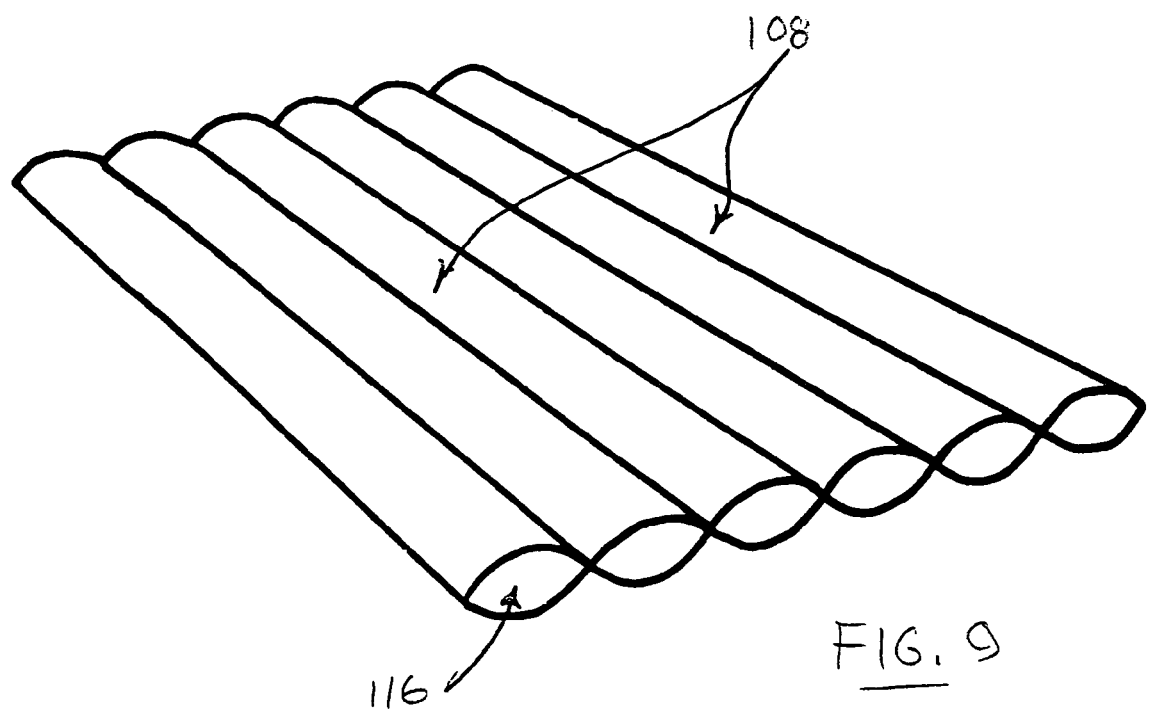
FIG. 9 is a schematic perspective view of the skin structure of the balloon shown in FIG. 3.

FIG. 9 shows a section of electrostatic skin with ribs 108 inflated. The interior 116 of each is almost a vacuum.

Figure 10:
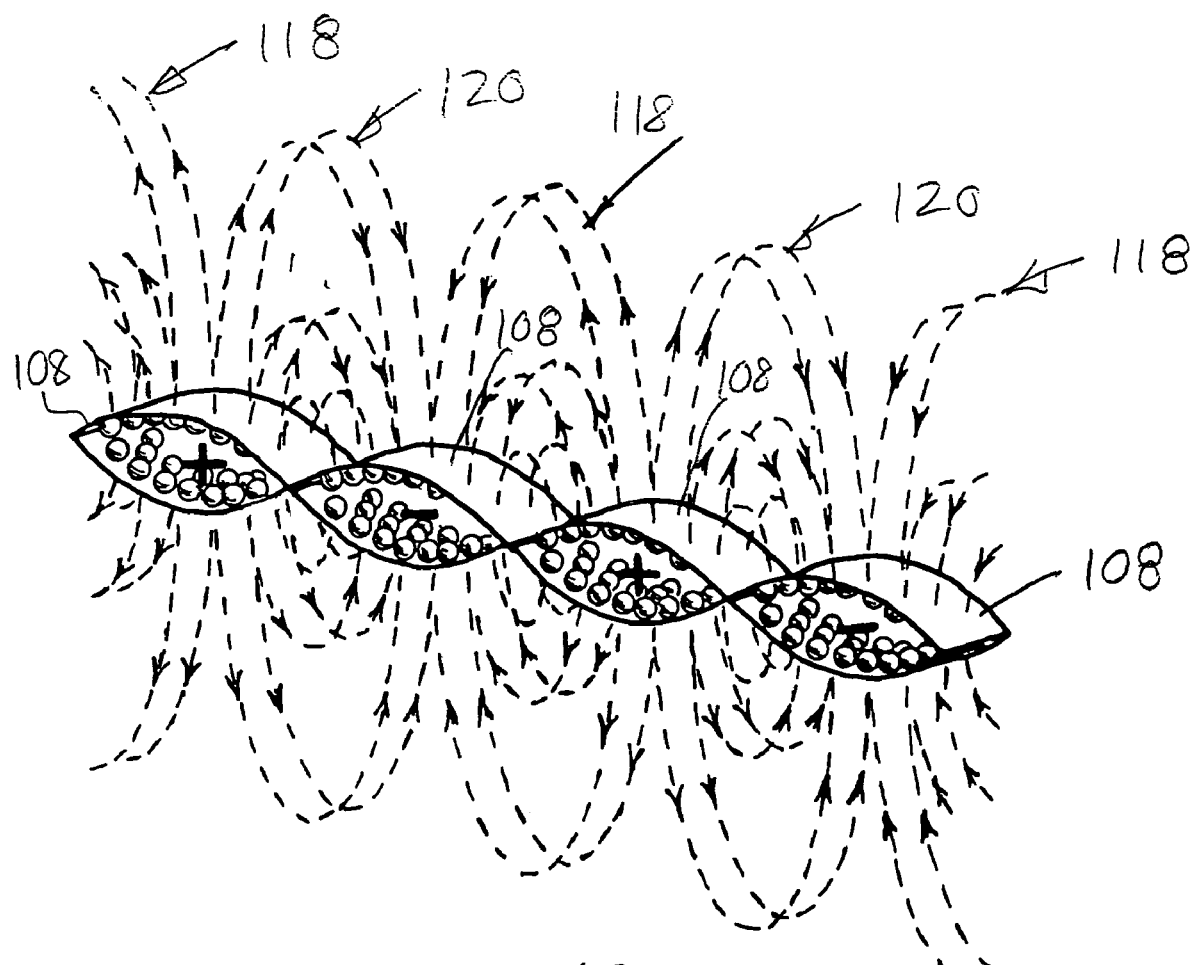
FIG. 10 is a schematic view illustrating the electric field lines for the skin of the balloon shown in FIGS. 3 and 9.

As it is shown in FIG. 10, the polarity of the electrostatic balloon ribs alternates between adjacent ribs. A positively charged rib is always preceded and followed by a negatively charged rib. The polarity of adjacent rows of electrostatic balloon ribs is alternated because if all of the ribs had the same polarity, then the electric field lines 118, 120 would not extend into the interior of the balloon. Coulomb's Law dictates that the electric field is zero within a conductive sphere that has a uniform electric charge. This would defeat the purpose of inflating the balloon skin with electric charge. By alternating the polarity of adjacent rows, this problem is solved. Electric field lines close between adjacent rows. The electric field at a distance from the surface of the balloon is zero (in the "far field"). Also, the net charge for the high-altitude reflector is near zero. (The balloon's charge is neutral). Thus, an external current source is not required to charge the electrostatic balloon.

Making the balloon neutral will reduce the attraction of dust and dirt. If the outer surface of the balloon is contaminated with a sufficient quantity of charged particles the electrostatic balloon will be neutralized. Neutralizing the outside layer of the electrostatic balloon rib may cause it to deflate. It may be advantageous to periodically change the polarity of each row to throw off any contaminants that have an electric charge.

It may also be advantageous to periodically totally discharge all of the electrostatic balloon ribs to purge any gas that may have leaked into the element via the osmosis process or to detect leaks. This is possible by using small one-way valves (not-shown) located at the end of each rib. A flow sensor might also be useful. A valve and flow sensor can be implemented with micro-electro-mechanical systems (MEMS) technology. Measuring the high gas flow would indicate the presence of leak. If a leak could be detected and isolated to an individual rib then it may be possible to repair or reduce the leak by simply not inflating (not charging) the rib.

The electrostatic balloon skin is inflated with an electric charge from a high-voltage source or charge pump 90 (FIGS. 6 and 7) located on the systems platform 70. The high-voltage lines or buses 124, 126 are routed along one of the support rods 72 (FIG. 6) and then around the annular truss 42. Each of the buses is electrically connected to every other electrostatic balloon rib. The inner opposed walls of all of the electrostatic balloon ribs is electrically conductive, but electrically isolated from the adjacent rib at the seams. The electric charge will distribute itself over the entire length of a rib due to the repulsive force of like charges. Similarly, opposed charges within a rib will force apart the outer and inner layers of the rib, thus inflating it.

At lower altitudes the charge usually will not be sufficient to overcome the high atmospheric pressure acting on the outer surface of the rib. However, at high altitudes the atmospheric pressure will be lower and the force applied by the electric charge will be sufficient to inflate the rib. If the rib is reasonably air tight, then a near vacuum will exist inside the rib. This makes the rib a good thermal insulator.

Figure 11:
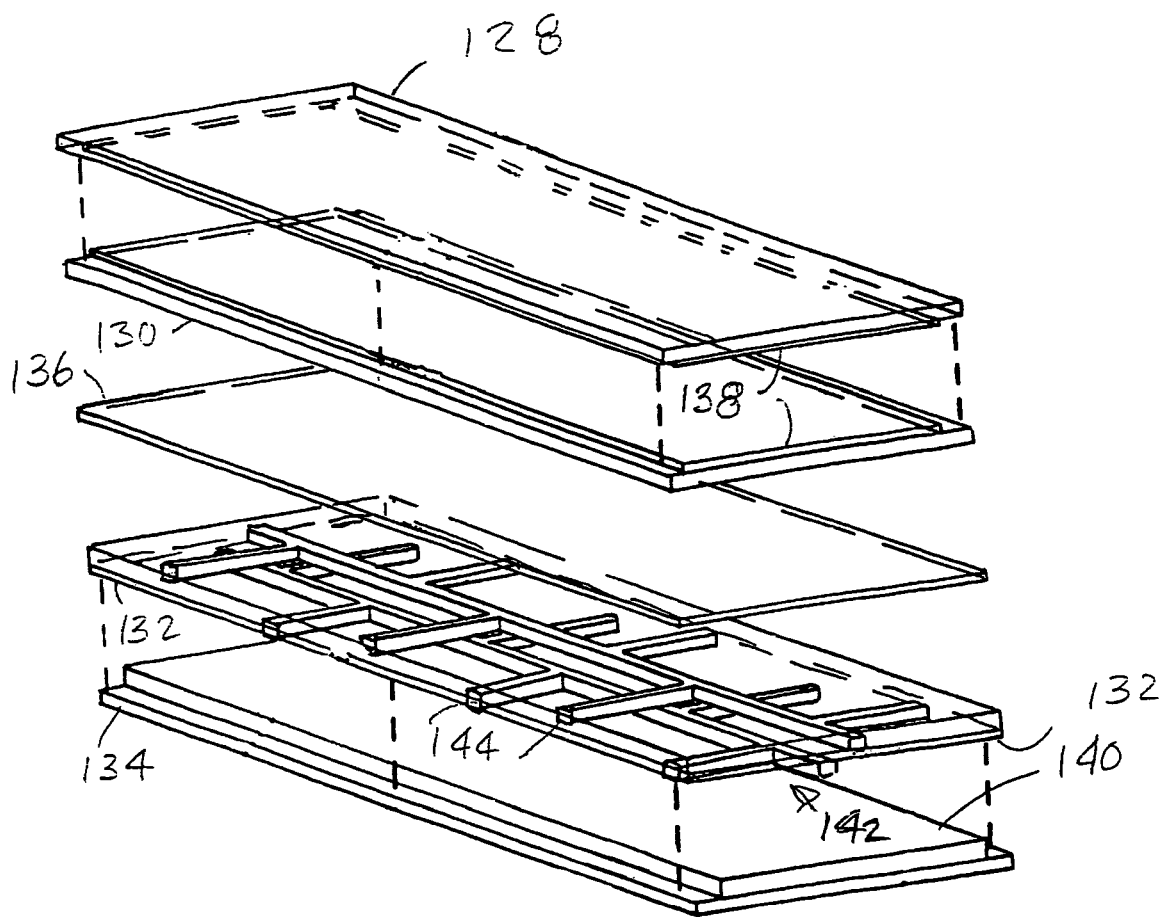
FIG. 11 is a partially schematic exploded perspective view of a portion of the balloon shown in FIG. 3.
Figure 12:
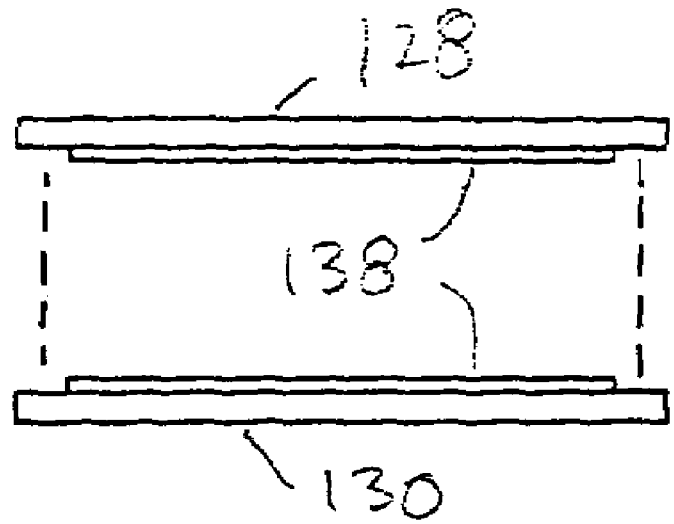
FIG. 12 is an elevation view of the structure of FIG. 11.
Figure 12:
Figure 12:
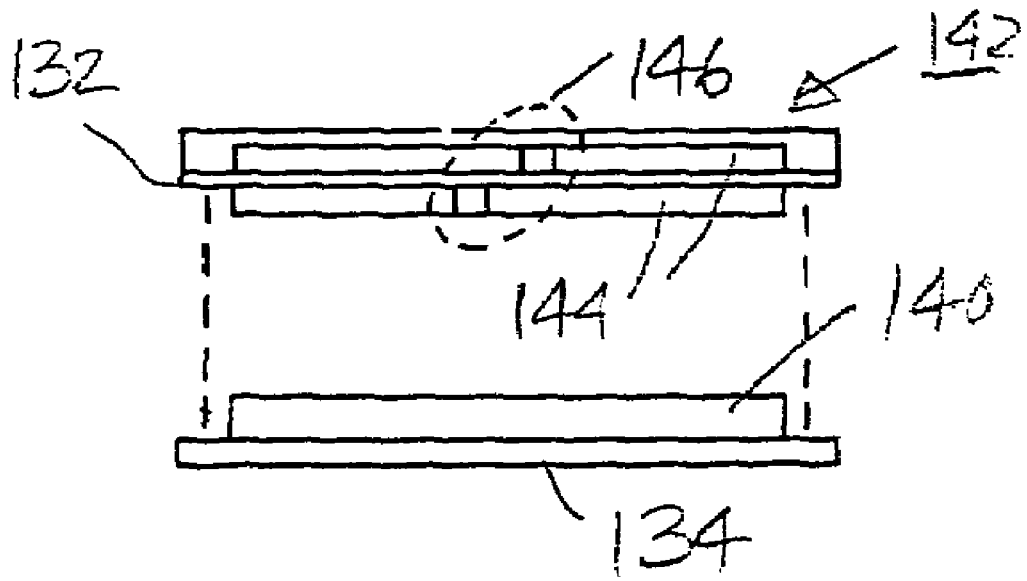

The balloon layers from top-to-bottom are illustrated in a schematic perspective view in FIG. 11. The two upper layers 128, 130 form the ribs in the upper hemisphere of the balloon (shown connected by dashed lines). Similarly, the two lower layers 132, 134 form the ribs in the lower hemisphere of the balloon (also shown connected by dashed lines). The thin layer 136 in the middle represents the diaphragm 44 (FIG. 3) that separates the upper cavity containing helium from the lower cavity 48 containing native air. FIG. 12 is an end elevation view of the structure of FIG. 11.

The outer surfaces of the electrostatic balloon ribs (upper and lower) and the diaphragm layer are made of oriented polyester, or Mylar™. This material is commonly used in party balloons. It is strong, chemically stable, lightweight, easily bonded, readily available, and relatively inexpensive.

The internal surfaces of the walls forming the ribs in the upper hemisphere are coated with thin electrically conductive layers 138 that are transparent to visible light and energy in the near-infrared portion of the spectrum. Thus, energy from the sun readily heats the interior through the electrostatic balloon skin in the balloon's upper hemisphere. The interior gas retains most of its heat because the heat lost due to radiation is very small, at moderate temperatures (e.g. below 100° C.), and the heat lost due to conduction is small, because the charged electrostatic balloon skin is thermally insulating. This effect is called the "greenhouse effect."

Reflective Balloon Skin

The electrostatic balloon ribs in the balloon's lower hemisphere have a different construction. The interior side of the lower surface has a relatively thick, reflective layer 140 of copper. Copper is used because it is electrically conductive, very ductile, abundant, and relatively inexpensive. The thickness of this layer is slightly less than the theoretical skin depth of the electrical current at the microwave frequency that is intended to be reflected by the high-altitude reflector. Most of the microwave energy is reflected off of the high-altitude reflector. However, a portion of the energy is allowed to be transmitted through this layer 140. The ratio of reflected and transmitted energy can be controlled by adjusting the thickness of the copper layer. The copper at the edges 139 does not extend into the seam region between adjacent ribs. Otherwise, an electrical "short" would occur.

The frequency of interest is 3 Gigahertz (GHz) to 10 GHz in the microwave band. This is described as the SHF band. It is also known as the X, C, and S bands, as defined by the Institute of Electrical Engineers (IEEE). This range of frequencies is desirable because it is not significantly affected by the weather. Attenuation due to fog and clouds becomes significant only above 30 GHz. Attenuation due to rain becomes significant above 10 GHz. The reflective copper layer should be 0.003 to 0.005 inches thick, to reflect most of the microwave energy but to allow some of the energy to pass through to the inner power collection layer. The width of the rib should be at least one wavelength to serve as an efficient reflector. The wavelength at 3 GHz is 10 centimeters (cm). The wavelength at. 10 GHz is 3 cm. Therefore, for the wavelength range of greatest interest the electrostatic rib is at least 3 cm wide.

Power Collection

Figure 13:
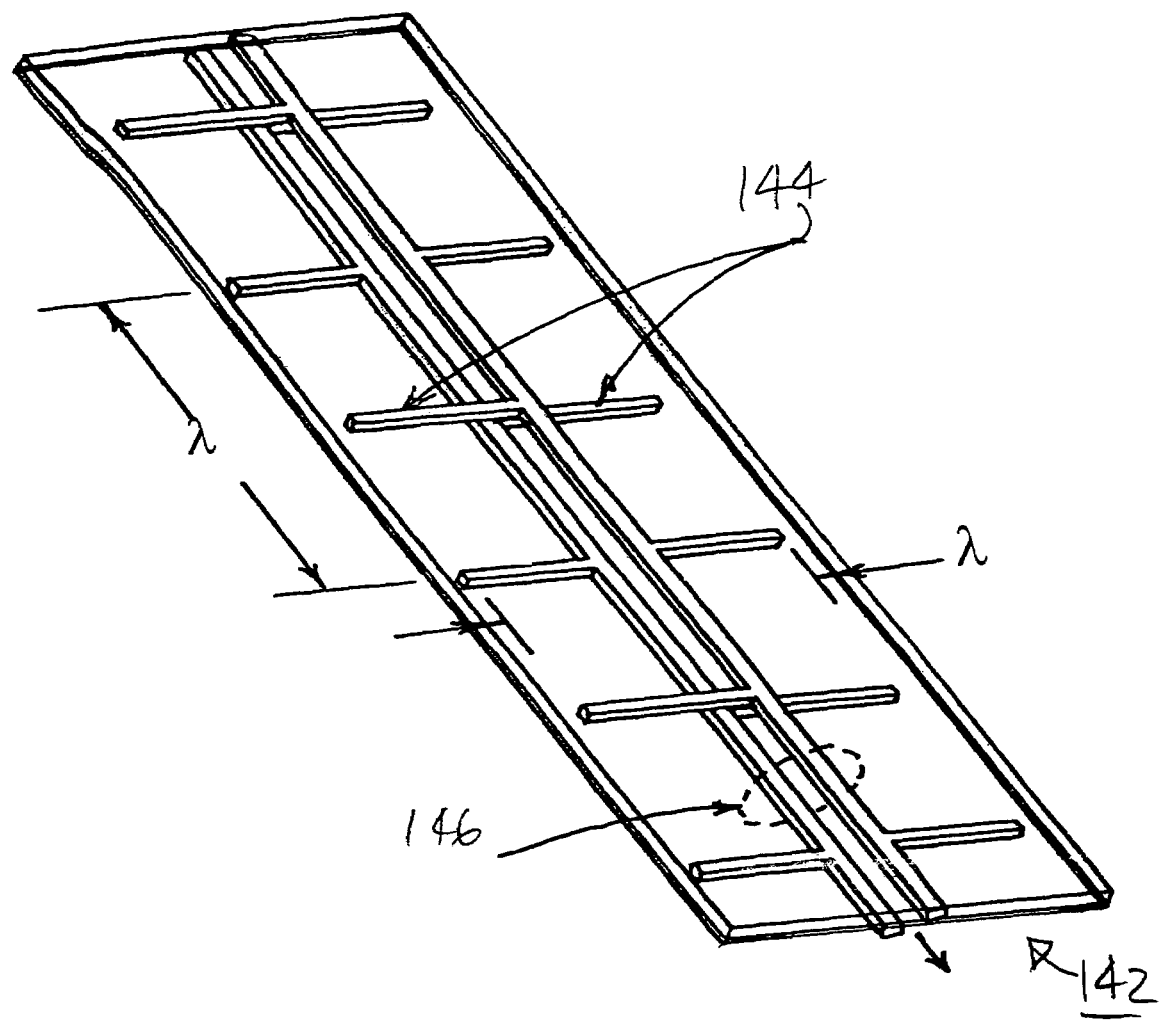
FIG. 13 is a perspective view, partially schematic, of a component of the structure shown in FIGS. 11 and 12.

A power collection structure 142 is shown schematically in FIG. 13, as well as FIGS. 11 AND 12. The structure 142 consists of a series of dipole antennas 144 and a transmission line 146 formed of very thin layers of copper. This configuration is known as a "curtain antenna." The insulating layer 132 (FIG. 12) between the antenna elements is conductive but it has a relatively high resistance sufficient to allow the static electric charge to distribute and collect on the inner layer of the electrostatic balloon rib without shorting out the microwave power collection circuit.

Figure 14:
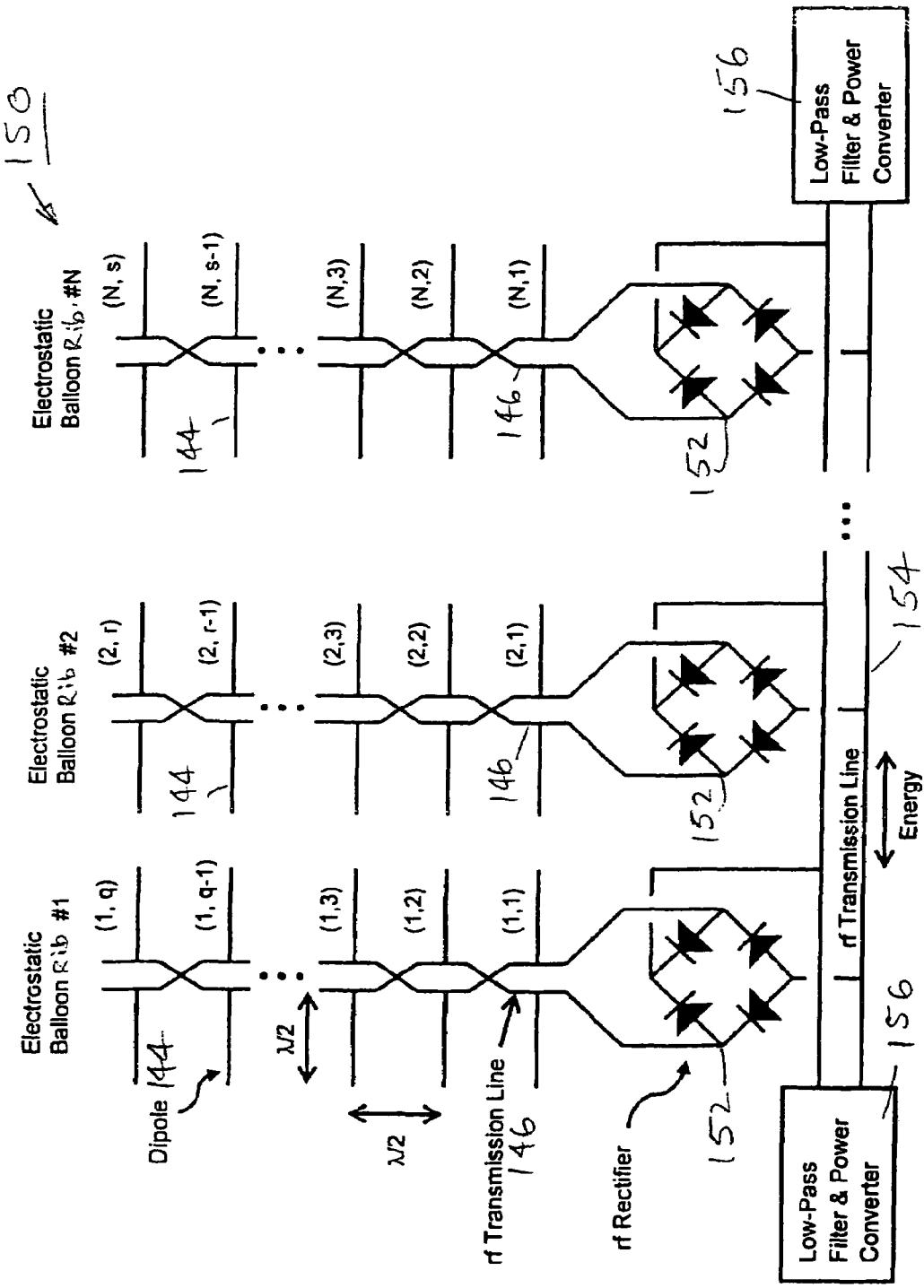
FIG. 14 is an electrical schematic view of a portion of the power collection system of the balloon shown in FIG. 3.

FIG. 14 is a schematic diagram of a power collection circuit 150. Power collected by each of the individual electrostatic balloon ribs is rectified by a rectifier circuit 152, summed, and distributed along a power collection transmission line 154 that runs along the perimeter of the annular truss. This power is filtered and converted by converters 156 to a DC voltage that is suitable for charging the battery and use by the various subsystems.

The efficiency of this power collection method is diminished by a number of factors. These include: orientation of the dipole antenna elements with respect to the wave front; wavelength mismatch; destructive interference between dipole antenna elements; and loss in the partially insulating layer. Assume that the power collection has an efficiency of 40 percent. Assume that the reflective layer reflects 80% of the microwave power and transmits 20% of the power to the inner surface of the lower layer. Then 8% of the total power is collected. If fifty local transmitters are focused on a High-altitude reflector and each transmitter has a total power of 200 watts then the total power impinging on the reflector surface is 10 kilowatts. Eight percent of 10 kilowatts is 800 watts of collected power. This should be more than enough to maintain the electric charge in the electrostatic balloon skin and to operate all of the craft's subsystems, under normal conditions.

While the power collection efficiency is only 40 percent, the energy is not lost. The 60 percent portion of the power that is not collected is mostly lost as heat. This represents a 1-kilowatt heat source within the balloon that has no weight penalty. This heat source is not very significant when compared to the solar heating effect during the day. However, it is present during the nighttime, as long as the craft is over a populated area. This external heat source will help to offset heat loss during the nighttime and also help to conserve the hydrogen fuel and extend the time that the craft can stay aloft.

Energy may also be collected from the sun during the day by using conventional arrays of solar cells mounted on the structural ring 42 or by using photovoltaic devices embedded in the balloon skin. It is also possible to recover and reuse the energy that is stored in the electrostatically charged skin.

Mathematical Model of Balloon Flight

A mathematical model and computer simulation was constructed for a hypothetical high-altitude reflector to show that a practical system could be constructed and operated for an extended duration at an altitude of 100,000 feet. The model includes dimensional and weight estimates for every component. Some of the model parameters are:

| | |
|---|---|
| Diameter: | 50 m |
| Total Height: | 126 ft. |
| Total Volume: | 2,600,000 ft³ |
| Total Surface Area: | 65,000 ft² |
| No. Truss Segments | 172 |
| No. of Aluminum Tubes in Truss: | 1,548 |
| Total Weight of Truss: | 200 lbs. |
| Total Weight of Balloon Material: | 3,270 lbs. |
| Combined Weight of Other Items: | 1,014 lbs. |
| No. of Helium Vessels: | 32 |
| No. of Hydrogen Vessels: | 11 |
| Weight of Helium: | 636 lbs. |
| Initial Weight of Hydrogen: | 124 lbs. |
| Total Initial Weight: | 5,244 lbs. |

The craft starts out on the ground. The ambient temperature is assumed to be 20° C. and the ambient pressure is 760 torr. Initially, there is no helium gas inside the balloon's upper chamber 46 (FIG. 3) and the lower chamber 48 is filled with native air, at a temperature of 29.5° C.

The air is heated and pumped in from an external source (not shown). Thirty-two pressure vessels are filled with liquid helium. Eleven pressure vessels are filled with liquid hydrogen. The total weight of the craft, including the heated native air, is 192,000 pounds; however, the displaced air weights 192,567 pounds. This gives the craft a positive buoyancy (or lift) of 567 pounds. The internal pressure is only 0.1 percent higher than the external pressure. This difference may not seem very significant; however, applied over the entire surface of the balloon this pressure results in a significant tension in the relatively small strength members that are imbedded in the balloon skin. The differential pressure is held constant over the entire flight time of the craft.

By starting with most or all of the gases in liquid form, better control of the ascent of the craft is maintained, but with a minimum of weight and space occupied, as compared with other gas-handling methods for high-altitude balloons.

The craft quickly rises as soon as it is released. As the craft ascends, helium gas is released into the upper chamber. The fill rate is controlled by boiling off the liquid helium at a rate that maintains a steady lift of approximately 500 pounds for the first 10,000 feet. Native air is allowed to be expelled from the lower chamber as the upper chamber expands. Hydrogen gas is burned to boil off the helium and to heat it to the desired temperature.

At 10,000 feet, the ambient temperature has fallen to 1.2° C. The ambient pressure is 552 torr. 13,274 cubic feet of helium gas, at a temperature of 10.7° C., has been vented into the upper chamber. An equivalent volume of air has been vented from the lower chamber to the outside. The craft continues to rapidly ascend with a lift force of 300 pounds. The two fans 104 and 106 maintain the craft's direction and provide the necessary thrust to keep the craft on its predetermined course.

At 20,000 feet, the ambient temperature is −18.2° C. and the ambient pressure is 372 torr. 42,857 cubic feet of helium gas, at a temperature of −8.7° C., has been vented into the upper chamber. The craft continues to ascend with a lift force of 200 pounds.

At 30,000 feet, the ambient temperature is −38.8° C. and the ambient pressure is 253 torr. 82,348 cubic feet of helium gas, at a temperature of −29.3° C., has been vented into the upper chamber. A 200 pound lift force is maintained. The craft ascends at a faster rate because the aerodynamic drag diminishes as the atmosphere thins.

At 40,000 feet, the ambient temperature is −60° C. and the ambient pressure is 170 torr. 138,842 cubic feet of helium gas, at a temperature of −50.5° C., has been vented into the upper chamber. Less hydrogen gas is needed to heat the helium as the craft ascends into the extremely cold atmosphere.

At 50,000 feet, the ambient temperature is slightly warmer at −57.3° C., but the ambient pressure continues to decline. The ambient pressure is 128 torr. 225,093 cubic feet of helium gas, at a temperature of −47.8° C., has been vented into the upper chamber.

At 60,000 feet, the ambient temperature is −54.6° C. and the ambient pressure is 87 torr. 392,978 cubic feet of helium gas, at a temperature of −45.1° C., has been vented into the upper chamber. The lift force is still 200 pounds.

At 70,000 feet, the ambient temperature is −51.2° C. and the ambient pressure is 57 torr. 648,250 cubic feet of helium gas, at a temperature of −45.1° C., has been vented into the upper chamber. The lift is reduced to 50 pounds. However, the craft continues to ascend at a fast rate due to the thinning atmosphere. At approximately 50 torr the electrostatic charge generator is activated to inflate the electrostatic balloon ribs.

At 80,000 feet, the ambient temperature is −46.6° C. and the ambient pressure is 43 torr. 879,259 cubic feet of helium gas, at a temperature of −32.9° C., has been vented into the upper chamber. A lift of 50 pounds is maintained.

At 90,000 feet, the ambient temperature is −42.1° C. and the ambient pressure is 30 torr. 1,326,147 cubic feet of helium gas, at a temperature of −22.1° C., has been vented into the upper chamber. A lift force of 50 pounds is maintained.

At 100,000 feet, the ambient temperature is −37.4° C. and the ambient pressure is 18 torr. 2,455,984 cubic feet of helium gas, at a temperature of −0.4° C., has been vented into the upper chamber. A lift force is reduced to 20 pounds. The craft will become neutrally buoyant at slightly above 100,000 ft. There is no remaining helium in the 32 helium tanks. However, only 25 percent of the liquid hydrogen has been consumed. Valves are closed to the upper chamber and valves are opened between the helium and hydrogen tanks. After several days, all of the liquid hydrogen will boil off due to solar heating and pressurize the 43 fuel vessels with hydrogen gas. The total volume of hydrogen is 110 cubic feet and the resulting pressure is 2,150 psi.

Thus, the empty helium tanks have been used for the storage of pressurized hydrogen, and the problem of storage of the gas after changing from liquid to gaseous form is solved neatly with a minimum of added weight and space.

The craft is believed to be capable of operating at approximately 100,000 feet for an extended duration. The internal gas is heated by solar heating during the daytime and the heat is conserved by the thermally insulating electrostatic balloon skin during the nighttime. Microwave power from the ground provides a portion of the electrical power that is needed to operate the craft. Additional electrical power is generated by the hydrogen fuel cell.

The craft lands before all of the hydrogen is totally consumed. To begin the descent, the charge is removed from the electrostatic balloon skin and the internal gas is allowed to cool to the ambient temperature. As the craft descends, the pressure will increase. To maintain the constant differential pressure, gas is pumped into the balloon. It may be necessary to burn some of the hydrogen to heat the air to slow the descent. When the craft approaches the ground the last remaining hydrogen is burned to stop the descent for landing.

Mathematical Model of Balloon Structure

A mathematical model for electrostatic balloon elements is set forth below. The high-altitude reflector 22 uses elongated electrostatic balloon ribs 108 in the electrostatic balloon skin. For simplicity, the following mathematical analysis is for a simple square-shaped electrostatic balloon rib. A very thin layer of material is assumed for this analysis to demonstrate the very unique buoyancy properties of electrostatic balloons.

Figure 15:
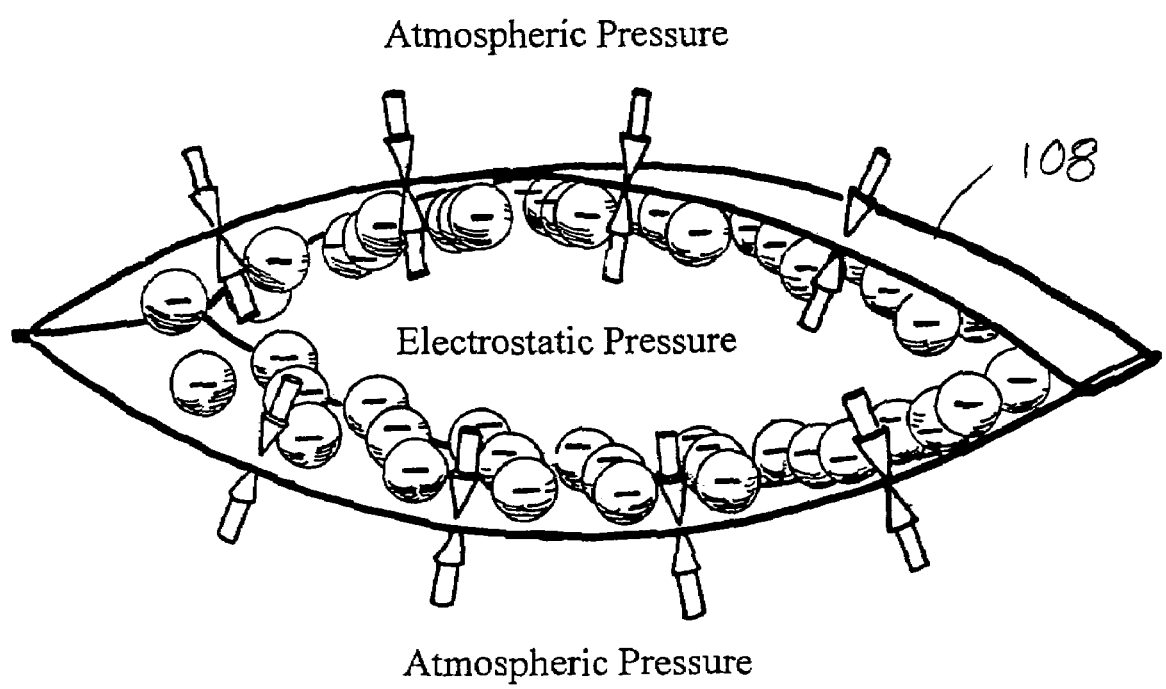
FIG. 15 is a schematic perspective view illustrating the operation of the electrostatically inflatable structure of the invention.

As is shown in FIG. 15, an electrostatic balloon rib 108 is a thin closed shell of electrically insulating material with an electric charge inside. The electric charge will evenly distribute over the interior wall and inflate the balloon. Like charges repel. The resulting electrostatic force inflates the balloon rib without the use of an interior gas.

The mass of the stored charge is negligible. The total mass of the balloon rib is the mass of the material use in the balloon skin. The density of the balloon is the total mass divided by the volume. If the stored charge is sufficient to keep the balloon inflated at a given atmospheric pressure and the balloon density is less than the density of the displaced gas, the balloon will rise. If either of these conditions is not satisfied, the balloon will deflate and fall.

An individual balloon of this type should be inflated at an altitude above its critical altitude, rather than being inflated on the ground, where the atmospheric pressure is highest. The balloon will maintain its shape as long as the charge is present. The balloon will stay afloat as long as gas does not leak into the balloon. When the balloon drops below the critical altitude it will collapse and rapidly fall to the ground.

First, consider LaPlace's Law (for conventional spherical gas-filled balloons):

$$(P_i - P_o) = 4T/r. \quad (1)$$

Where, $P_i$ is the in inside pressure, $P_o$ is the outside pressure, T is the surface tension, and r is the balloon radius. In the case of a gasless electrostatic balloon the inside gas pressure is replace by an equivalent electrostatic pressure.

Columb's Law defines the opposing force between two equal electronic charges:

$$F = q^2/(4\pi\epsilon_o r^2). \quad (2)$$

Where, F is force, q is the electric charge, r is the distance between the two charges, and $\epsilon_o = 8.85418 \times 10^{-12}$ (called the permittivity constant, with units of coulomb $^2$/nt·m$^2$)

Atmospheric pressure is the force-per-unit-area exerted by a column of gas above an area on the Earth's surface. Units of atmospheric pressure include inches-of-mercury ("Hg), millimeters-of-mercury (torr), Atmospheres (atm), and pounds-per-square inch (psi). Useful conversion factors are: 29.92 "Hg=760 torr=1.0 atm=14.7 psi (average pressure at sea-level).

The density (d) of a gas is given by the expression:

$$d = PM/RT. \quad (3)$$

Where P is the pressure in torr, M is the molar mass (dimensionless), R is the gas constant=62.36 liter-torr/mol-° K., and T is the temperature in degrees-Kelvin. Add 273 to convert from degrees-Centigrade to degrees-Kelvin. Molar mass is calculated by summing the atomic weights.

The earth's atmosphere is made up of 78% nitrogen ($N_2$) and 21% oxygen ($O_2$). The remaining 1% contains inert trace gasses (argon, neon, helium, krypton, and xenon). The molar mass of nitrogen (atomic weight of 14.0) is 2*14=28. The molar mass of oxygen (atomic weight of 16.0). is 2*16=32. Earth's atmosphere is not a uniform mix of gasses from top-to-bottom; however, since nitrogen and oxygen are close on the Periodic Chart and the other trace gases are only 1%, the equivalent molar mass for Earth's atmosphere is approximately 0.78*28+0.21*32=28.6 grams/mole.

A useful formula for calculating the approximate atmospheric pressure at any altitude is:

$$P = P_{surface} e^{-h/H}. \quad (4)$$

Where H is the Scale Height. The Scale Height of Earth's atmosphere is approximately 7 km or 22,966 ft.

To proceed with the analysis, some arbitrary assumptions are made on the size, shape, and material of the balloon. Several parameters must be calculated to show the feasibility of an electrostatic balloon concept. These include: the maximum altitude at which the balloon will float, the charge required to inflate the balloon, the critical altitude at which the balloon will collapse and fall, the lift-to-weight ratio at the critical altitude (i.e., tendency of the balloon to recover to a safe altitude), and the surface tension of the balloon skin relative to the strength of the material (i.e., the structural integrity of the balloon).

Assume a pillow-shaped balloon with a very thin skin. Assume that the balloon has an average thickness of 1 cm (h) and an equivalent size on edge of 5 cm (both x and y). Assume that the balloon skin material is approximately 10 nm thick (approximately 10 atoms thick). Assume that the skin material is plastic with a specific gravity or 1.4; i.e., density of 1.4 kg/liter.

For this example, the volume of the balloon is $2.50 \times 10^{-2}$ liter. The mass of the balloon is $7.0 \times 10^{-5}$ grams. The density of the balloon is $2.80 \times 10^{-3}$ grams/liter. The maximum altitude of the balloon is determined by solving for the atmospheric pressure that gives the same density as the balloon (neutral buoyancy) in equation (3) and substituting this result into equation (4), then solving for the altitude; i.e.:

$$h = -\log_e(dRT/760M) \cdot H = 139{,}402 \text{ ft.} \quad (5)$$

Assume a minimum altitude of 100,000 feet (approximately 19 miles). This minimum altitude is still well above the capability of known aircraft and most balloons. What electric charge is required to inflate an electrostatic balloon at this altitude? The atmospheric pressure at this altitude is:

$$P_{max} = 14.7\, e^{-(100{,}000/22{,}966)} = 0.19 \text{ psi.} \quad (6)$$

Combining equations (2) and (6) yields the expression:

$$P_{max} = F/A = q^2/(4\pi\epsilon_0 r^2 A) = 0.19 \text{ psi.} \quad (7)$$

The total electric charge is 2q because the charge is divided equally between the top and bottom of the pillow-shaped balloon:

$$2q = 2 \cdot [4\pi\varepsilon_o r^2 A \cdot 0.19]^{-1/2} \quad (8)$$
$$= 3.82 \times 10^{-7} \text{ couloumb}$$

A single electron has a $1.60 \times 10^{-19}$ coulomb charge. Therefore, the balloon must be charged with $2.39 \times 10^{12}$ electrons to remain inflated at 100,000 ft. This may seem like a large number; however, it is not an unreasonably large number of electrons. One ampere (amp) is one coulomb per second. The charge required to inflate the balloon is the same as the charge that flows through a 40-watt light bulb in 1 millionth of a second (one microsecond).

It is useful to be able to relate mass of an object to its gravitational pull or weight on Earth. Newton's Law of Gravitation gives the force of gravity ($F_g$) on an object with mass (m) that is located on or above the surface of the Earth:

$$F_g = GM_E m/r^2. \quad (9)$$

Where $G = 6.673 \times 10^{-11}$ N·m$^2$/kg$^2$ (called the Universal Gravitational Constant), $M_E$ is the mass of the Earth, and distance of the object from the center of the earth. $M^E = 5.972 \times 10^{24}$ kg. If the object is near the surface of the earth, $r = R^E = 6.378 \times 10^6$ meters. The acceleration of gravity on the surface of the Earth (and in the stratosphere) is:

$$g = GM_E/R_E^2 = 9.80 \text{ m/s}^2. \quad (10)$$

The weight of the balloon is given by the expression:

$$W = mg = (7.0 \times 10^{-8} \text{ kg}) \cdot (9.8 \text{ m/s}^2) \quad (11)$$
$$= 6.86 \times 10^{-7} Nt.$$

One kg·m/s$^2$ is equivalent to one newton (Nt), a unit of force. This balloon weight corresponds to $1.54 \times 10^{-7}$ pounds or $9.62 \times 10^{-9}$ ounces.

Using equation (5) to calculate the density of the displaced gas at 100,000 ft. and multiplying by the volume of the balloon predicts an upward force on the balloon of $5.35 \times 10^{-8}$ ounces. Thus, the lift-to-weight ratio at 100,000 ft. is 5.6. This is a significant lift-to-weight ratio when compared to an aircraft; however, the opposing forces on the electrostatic balloon are very small.

A rough calculation of the maximum surface tension can be made by assuming that the balloon is approximately spherical in shape in the vacuum of space. A circumference of 12 cm corresponds to a diameter of approximately 3.8 cm. The charge calculations were based on a pillow-shaped balloon that is 1 cm thick. Since the electrostatic force diminishes with the square of the distance the same charge in a vacuum will result in a surface tension of 32.7 kpsi (472 kpsi×(1/3.8)$^2$). This value is within reason for high strength plastics. Furthermore, if it becomes necessary, increasing the surface area of the balloon can further reduce this surface tension.

Foremost, it is important to consider the electrostatic balloon as a building block for a larger structure. Just like conventional floating balloons, an electrostatic balloon will maintain its shape when its skin in under tension; i.e., slightly above its equilibrium altitude.

The above mathematical analysis examined a solitary electrostatic balloon element or rib. The Electrostatic Balloon Element has a very thin skin. It is capable of inflating above a critical altitude. It is positively buoyant above its critical altitude.

The high-altitude reflector is positively buoyant on its own merits. It is not necessary for the material that is used in the skin to be extremely thin (as assumed in the math model). The high-altitude reflector will benefit from the slightly increased buoyancy when the Electrostatic Balloon Ribs are inflated; however, it does not depend on this slight boost for maintaining its altitude.

A self-contained system comprising a single solitary electrostatic balloon element has other possible applications. For example, electrostatically inflated structures can be used in outer space to form light-weight antenna or other structures for satellites or space craft. However, the high-altitude reflector represents a practical near-term application that uses a large number of electrostatic balloon elements. The high-altitude reflector takes advantage of the fact that the electrostatic balloon elements have a near-vacuum inside. When the elements are inflated above the critical altitude, the skin becomes thermally insulating. This is a substantial advantage of using electrostatic balloons in the global communications system of the invention.

The above description of the invention is intended to be illustrative and not limiting. Various changes or modifications in the embodiments described may occur to those skilled in the art. These can be made without departing from the spirit or scope of the invention.

What is claimed is:

1. An electrostatically inflatable high-altitude balloon wall structure comprising
   (a) a plurality of sealed air-tight containers, each comprising flexible opposed walls having opposed conductive surfaces and substantially devoid of air, and
   (b) a voltage source connected to said containers for applying electrical voltages to said surfaces to cause them to electrostatically repel one another when said container is in a low ambient pressure environment, and
   (c) said containers being joined together side-by-side to form a balloon wall made of such containers.

2. A structure as in claim 1 in which the electrical voltages applied to adjacent ones of said containers are of opposite polarity.

3. A structure as in claim 1 said conductive surfaces being electrically isolated from one another.

4. A structure as in claim 1 in which each of said walls is a thin plastic sheet with said sheets sealed together at their edges.

5. A structure as in claim 1 in which said walls are substantially transparent to radiation selected from the group consisting of sunlight and near-infrared radiation.

6. A high-altitude balloon comprising:
(a) a lighter-than-air gas compartment formed by at least one wall;
(b) said at least one wall having at least an upper portion including a plurality of compartments joined with one another side-by-side, each having opposed conductive inner wall surfaces capable of being charged with a voltage to create an electrostatic field between said inner wall surfaces and forming an upper cavity, said at least one wall having a lower portion forming a lower cavity comprising said plurality of said compartments, and a flexible diaphragm separating said upper cavity from said lower cavity and operable to allow the volume of a gas to expand when heated and contract when cooled;
(c) each of said compartments being sealed, air-tight, and substantially devoid of air; and
(d) a voltage source connected to said compartments for applying electrical voltages to said inner wall surfaces to cause them to electrostatically repel one another when said compartment is in a low ambient pressure environment.

7. A balloon as in claim 6 in which said upper portion is substantially transparent to radiation selected from the group consisting of sunlight and near-infrared radiation.

8. A balloon as in claim 6, in which said lower portion of said at least one wall is electromagnetic wave-reflecting; and further comprising an annular support structure, said lower portion being secured thereto, and a plurality of struts secured between said annular support structure and said lower portion to stabilize said lower portion, said lower portion being vented to the atmosphere to accommodate the gas flows due to flexing of said diaphragm.

9. A balloon as in claim 8 including a heater to heat said gas, a voltage supply, a propulsion system, a fuel supply for said heater, a gas supply, and a processor for controlling the operation of said heater, said voltage supply, said gas supply and said propulsion system pursuant to signals selected from the group consisting of pre-programmed information signals and wireless signals.

10. A balloon as in claim 6 in which said lower portion of said at least one wall includes an outermost wall section having a surface reflective to electromagnetic radiation, and an annular support member to which said at least one wall is attached.

11. A balloon as in claim 6 in which the polarity of the fields in successive areas of said compartments alternates.

12. A communications system comprising
(a) at least one airborne high-altitude balloon as recited in claim 6 and having a surface reflective of electromagnetic waves beamed up from the earth's surface,
(b) at least one ground-based transmitter for beaming electromagnetic communications information towards said reflector; and
(c) at least one ground-based receiver for receiving information reflected from said reflector.

13. A system as in claim 12 including a plurality of said balloons deployed at spaced intervals over at least a substantial portion of the earth's surface, and wherein the polarity of said field alternates from one of said containers to the next.

14. A system as in claim 13 including a Global Positioning System (GPS) for locating each of said balloons and aiming said transmitter at a selected one of said balloons.

15. A high-altitude balloon comprising:
(a) a lighter-than-air gas compartment formed by at least one wall;
(b) said at least one wall having at least an upper portion including a plurality of compartments joined with one another side-by-side, each having opposed conductive inner wall surfaces capable of being charged with a voltage to create an electrostatic field between said inner wall surfaces and forming an upper cavity, said at least one wall having a lower portion forming a lower cavity comprising said plurality of said compartments, and a flexible diaphragm separating said upper cavity from said lower cavity and operable to allow the volume of a gas to expand when heated and contract when cooled;
(c) each of said compartments being sealed, air-tight, and substantially devoid of air;
(d) a voltage source connected to said compartments for applying electrical voltages to said inner wall surfaces to cause them to electrostatically repel one another when said compartment is in a low ambient pressure environment; and
(e) one of said inner wall surfaces of said lower portion comprises an antenna array for receiving electrical power beamed towards said balloon from afar, and a propulsion system using said power to maneuver said balloon.

* * * * *